US012654681B2

(12) United States Patent
Yan

(10) Patent No.: US 12,654,681 B2
(45) Date of Patent: Jun. 16, 2026

(54) VEHICLE TORQUE DISTRIBUTION METHOD, VEHICLE, AND STORAGE MEDIUM

(71) Applicant: BEIJING CO WHEELS TECHNOLOGY CO., LTD., Beijing (CN)

(72) Inventor: Zhongyi Yan, Beijing (CN)

(73) Assignee: BEIJING CO WHEELS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/864,087

(22) PCT Filed: May 9, 2023

(86) PCT No.: PCT/CN2023/093033
§ 371 (c)(1),
(2) Date: Nov. 8, 2024

(87) PCT Pub. No.: WO2023/217147
PCT Pub. Date: Nov. 16, 2023

(65) Prior Publication Data
US 2025/0256702 A1 Aug. 14, 2025

(30) Foreign Application Priority Data
May 10, 2022 (CN) .......................... 202210506923.9

(51) Int. Cl.
*B60W 30/02* (2012.01)

(52) U.S. Cl.
CPC ......... *B60W 30/02* (2013.01); *B60W 2520/10* (2013.01); *B60W 2520/105* (2013.01);
(Continued)

(58) Field of Classification Search
CPC ............. B60W 30/02; B60W 2520/10; B60W 2520/105; B60W 2520/125; B60W 2520/14; B60W 2520/40
See application file for complete search history.

(56) References Cited

U.S. PATENT DOCUMENTS 5,752,211 A * 5/1998 Takasaki ............ B60K 23/0808
701/88
6,663,536 B1 * 12/2003 Meier ...................... B60T 8/175
180/248
(Continued)

FOREIGN PATENT DOCUMENTS

CN 108313062 7/2018
CN 109969165 A * 7/2019 ............ B60W 40/00
(Continued)

OTHER PUBLICATIONS

WIPO, International Search Report and Written Opinion for PCT/CN2023/093033, Jul. 13, 2023.
(Continued)

*Primary Examiner* — Edwin A Young
(74) *Attorney, Agent, or Firm* — Hodgson Russ LLP

(57) ABSTRACT

A vehicle torque distribution method includes: determining a uniform-speed torque distribution coefficient according to a speed parameter of the vehicle, and a preset corresponding relationship between the speed parameter and the uniform-speed torque distribution coefficient; determining an acceleration torque distribution coefficient according to the speed parameter of the vehicle, and a preset corresponding relationship between the speed parameter and the acceleration torque distribution coefficient; determining a first weight coefficient of the uniform-speed torque distribution coefficient and a second weight coefficient of the acceleration torque distribution coefficient according to an acceleration of the vehicle and a weight coefficient corresponding rela-
(Continued)

determining a uniform-speed torque distribution coefficient according to a speed parameter of the vehicle, and a preset corresponding relationship between the speed parameter and the uniform-speed torque distribution coefficient ~ 101 determining an acceleration torque distribution coefficient according to the speed parameter of the vehicle, and a preset corresponding relationship between the speed parameter and the acceleration torque distribution coefficient ~ 102 determining a first weight coefficient of the uniform-speed torque distribution coefficient and a second weight coefficient of the acceleration torque distribution coefficient according to an acceleration of the vehicle and a weight coefficient corresponding relationship ~ 103 obtaining a target torque distribution coefficient by performing a weight processing on the uniform-speed torque distribution coefficient and the acceleration torque distribution coefficient according to the first weight coefficient and the second weight coefficient ~ 104 tionship; and obtaining a target torque distribution coefficient by performing a weight processing on the uniform-speed torque distribution coefficient and the acceleration torque distribution coefficient according to the first weight coefficient and the second weight coefficient.

19 Claims, 8 Drawing Sheets

(52) U.S. Cl.
CPC ... *B60W 2520/125* (2013.01); *B60W 2520/14* (2013.01); *B60W 2520/40* (2013.01)

(56) References Cited

U.S. PATENT DOCUMENTS

| | | | |
|---|---|---|---|
| 2005/0103551 A1 | 5/2005 | Matsuno | |
| 2022/0032911 A1 | 2/2022 | Kim et al. | |

FOREIGN PATENT DOCUMENTS

| | | |
|---|---|---|
| CN | 110194168 | 9/2019 |
| CN | 110606075 | 12/2019 |
| CN | 111634284 | 9/2020 |
| CN | 112549982 | 3/2021 |
| CN | 112622644 | 4/2021 |
| CN | 112752691 | 5/2021 |
| CN | 112977082 | 6/2021 |
| CN | 113022531 | 6/2021 |
| CN | 113353081 | 9/2021 |
| DE | 102016217547 | 3/2018 |
| JP | 2005145334 | 6/2005 |
| JP | 2009269577 | 11/2009 |
| JP | 2019104400 A | * 6/2019 |
| JP | 7034225 | 3/2022 |
| WO | 2019015666 | 1/2019 |

OTHER PUBLICATIONS

EPO, Extended European Search Report for EP Application No. 23802916.9, Aug. 25, 2025.

CNIPA, First Office Action for CN Application No. 202210506923.9, Mar. 17, 2026.

CNIPA, Notification to Grant Patent Right for Invention for CN Application No. 202210506923.9, Apr. 29, 2026.

* cited by examiner

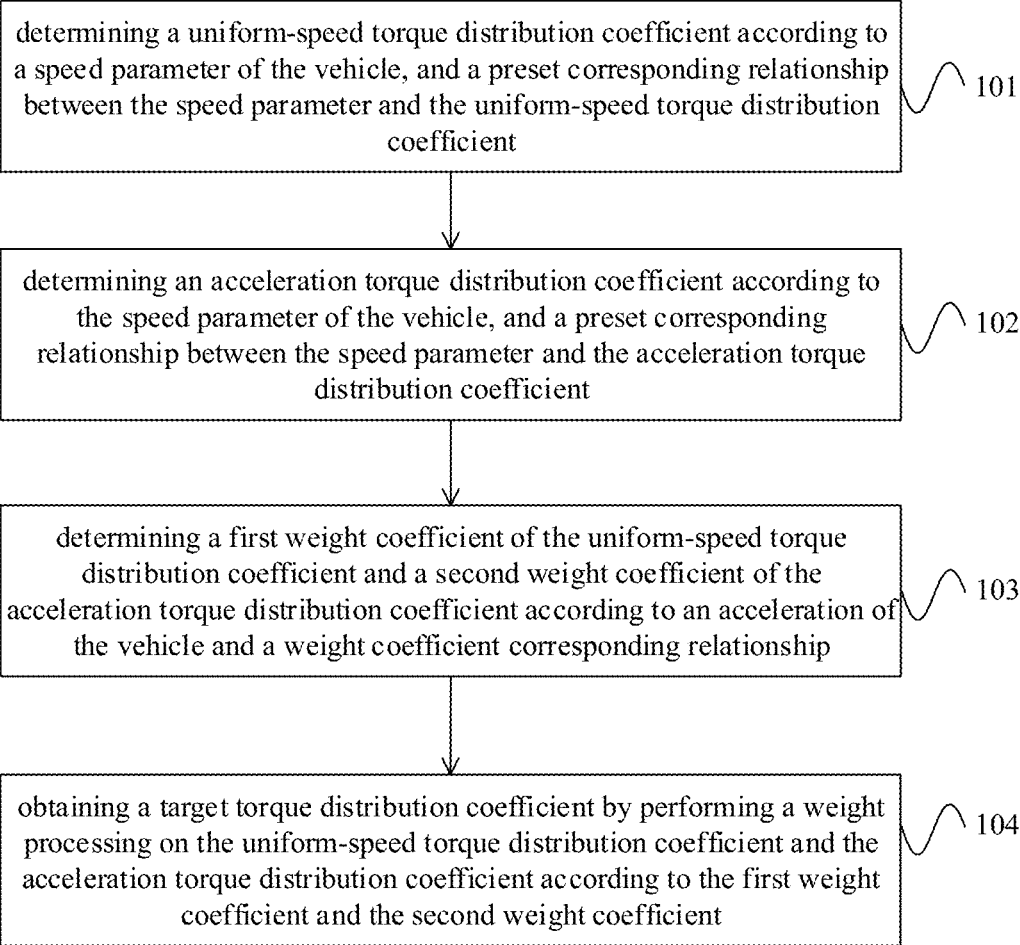

determining a uniform-speed torque distribution coefficient according to a speed parameter of the vehicle, and a preset corresponding relationship between the speed parameter and the uniform-speed torque distribution coefficient 101 determining an acceleration torque distribution coefficient according to the speed parameter of the vehicle, and a preset corresponding relationship between the speed parameter and the acceleration torque distribution coefficient 102 determining a first weight coefficient of the uniform-speed torque distribution coefficient and a second weight coefficient of the acceleration torque distribution coefficient according to an acceleration of the vehicle and a weight coefficient corresponding relationship 103 obtaining a target torque distribution coefficient by performing a weight processing on the uniform-speed torque distribution coefficient and the acceleration torque distribution coefficient according to the first weight coefficient and the second weight coefficient 104

FIG. 1

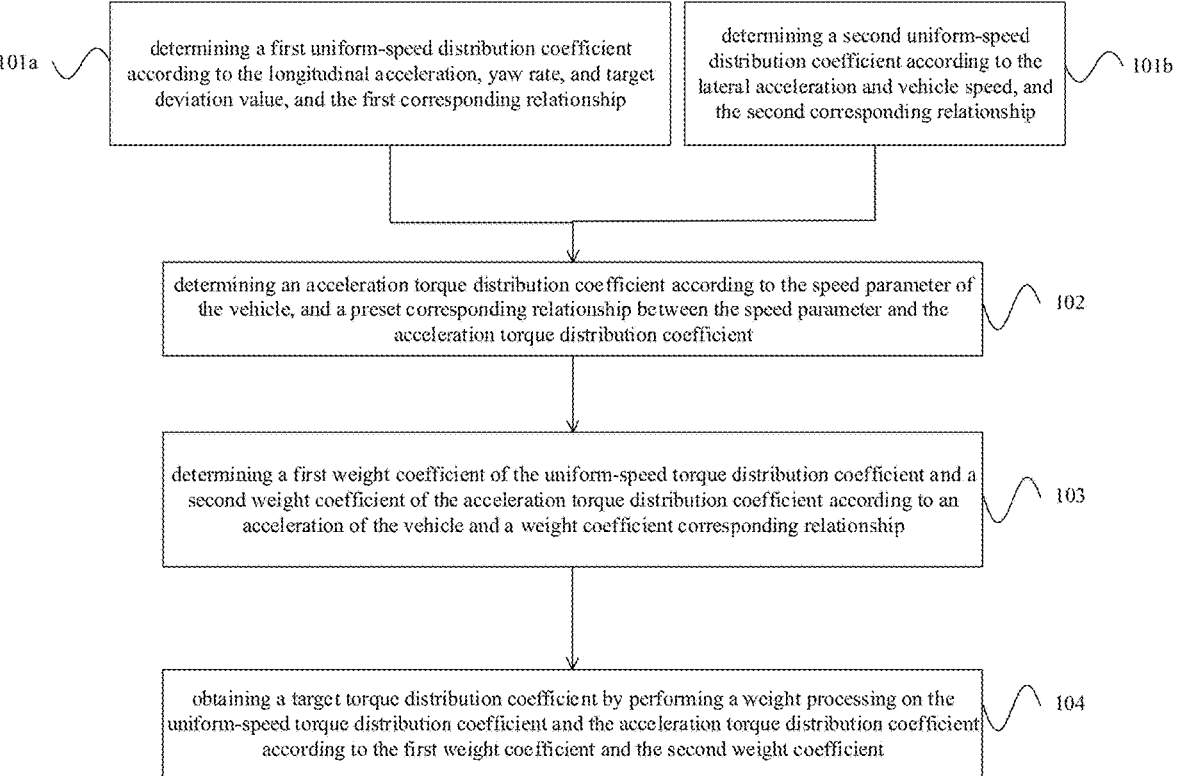

101a — determining a first uniform-speed distribution coefficient according to the longitudinal acceleration, yaw rate, and target deviation value, and the first corresponding relationship 101b — determining a second uniform-speed distribution coefficient according to the lateral acceleration and vehicle speed, and the second corresponding relationship 102 — determining an acceleration torque distribution coefficient according to the speed parameter of the vehicle, and a preset corresponding relationship between the speed parameter and the acceleration torque distribution coefficient 103 — determining a first weight coefficient of the uniform-speed torque distribution coefficient and a second weight coefficient of the acceleration torque distribution coefficient according to an acceleration of the vehicle and a weight coefficient corresponding relationship 104 — obtaining a target torque distribution coefficient by performing a weight processing on the uniform-speed torque distribution coefficient and the acceleration torque distribution coefficient according to the first weight coefficient and the second weight coefficient

FIG. 2

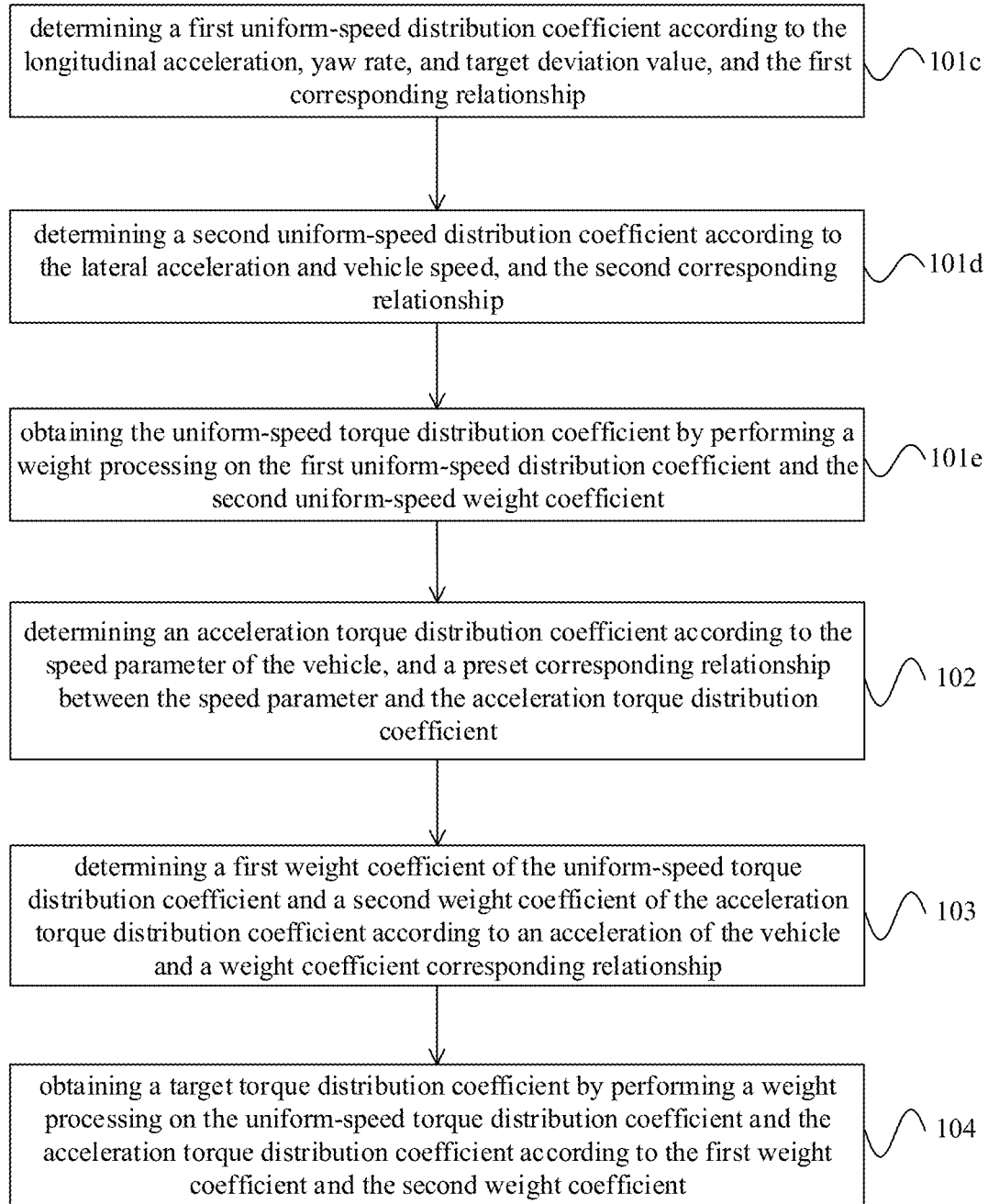

determining a first uniform-speed distribution coefficient according to the longitudinal acceleration, yaw rate, and target deviation value, and the first corresponding relationship — 101c determining a second uniform-speed distribution coefficient according to the lateral acceleration and vehicle speed, and the second corresponding relationship — 101d obtaining the uniform-speed torque distribution coefficient by performing a weight processing on the first uniform-speed distribution coefficient and the second uniform-speed weight coefficient — 101e determining an acceleration torque distribution coefficient according to the speed parameter of the vehicle, and a preset corresponding relationship between the speed parameter and the acceleration torque distribution coefficient — 102 determining a first weight coefficient of the uniform-speed torque distribution coefficient and a second weight coefficient of the acceleration torque distribution coefficient according to an acceleration of the vehicle and a weight coefficient corresponding relationship — 103 obtaining a target torque distribution coefficient by performing a weight processing on the uniform-speed torque distribution coefficient and the acceleration torque distribution coefficient according to the first weight coefficient and the second weight coefficient — 104

FIG. 3

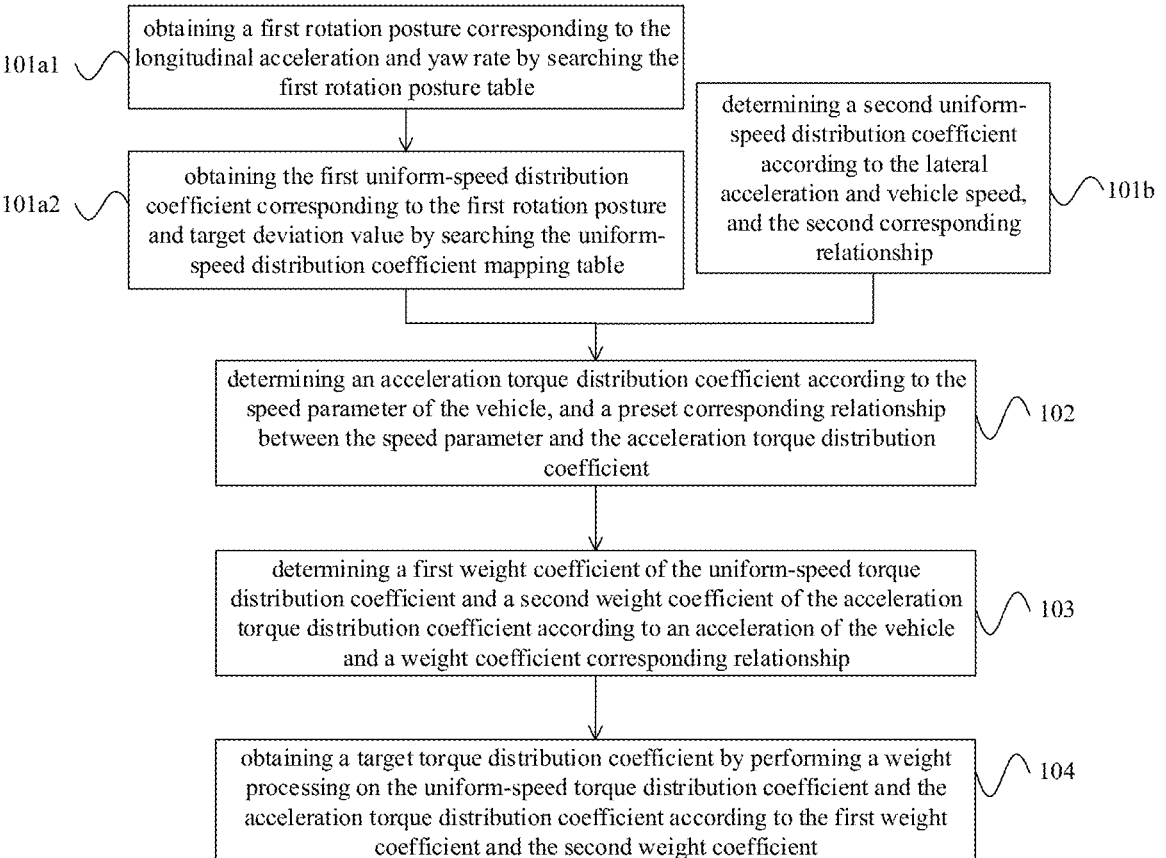

101a1 — obtaining a first rotation posture corresponding to the longitudinal acceleration and yaw rate by searching the first rotation posture table 101a2 — obtaining the first uniform-speed distribution coefficient corresponding to the first rotation posture and target deviation value by searching the uniform-speed distribution coefficient mapping table 101b — determining a second uniform-speed distribution coefficient according to the lateral acceleration and vehicle speed, and the second corresponding relationship 102 — determining an acceleration torque distribution coefficient according to the speed parameter of the vehicle, and a preset corresponding relationship between the speed parameter and the acceleration torque distribution coefficient 103 — determining a first weight coefficient of the uniform-speed torque distribution coefficient and a second weight coefficient of the acceleration torque distribution coefficient according to an acceleration of the vehicle and a weight coefficient corresponding relationship 104 — obtaining a target torque distribution coefficient by performing a weight processing on the uniform-speed torque distribution coefficient and the acceleration torque distribution coefficient according to the first weight coefficient and the second weight coefficient

FIG. 4

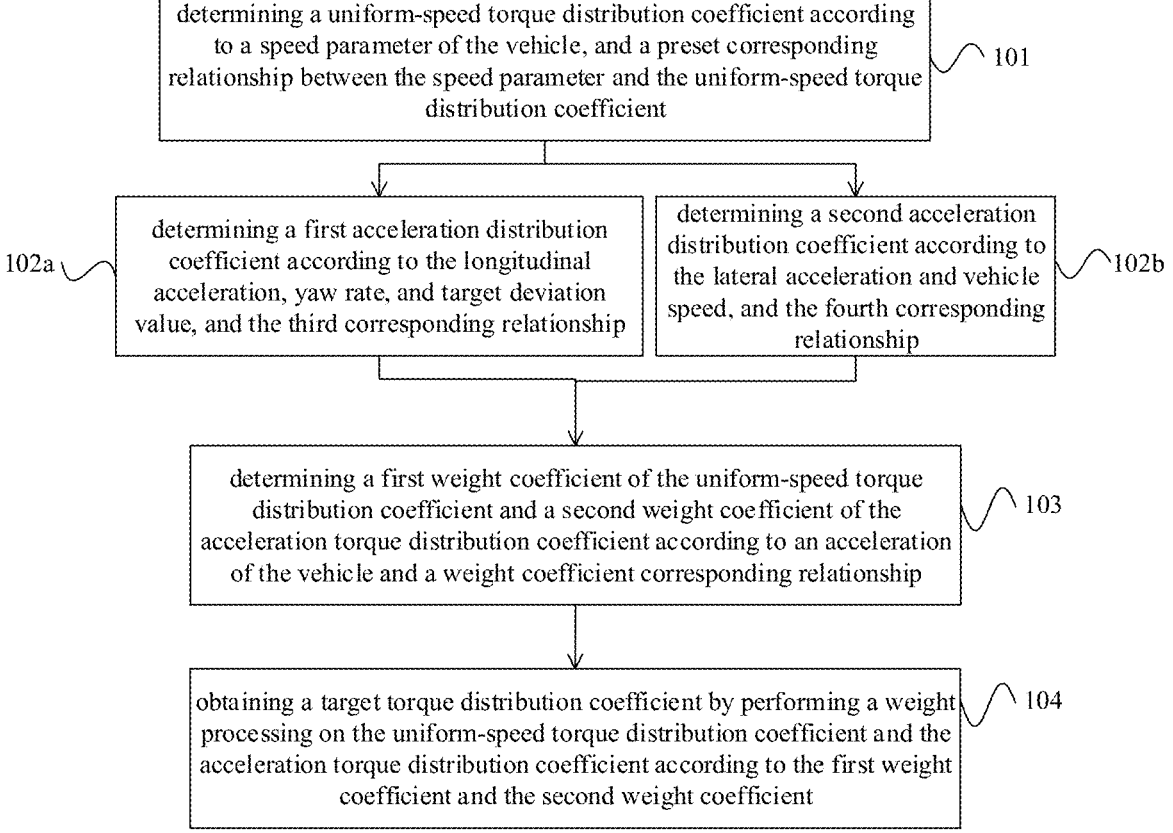

determining a uniform-speed torque distribution coefficient according to a speed parameter of the vehicle, and a preset corresponding relationship between the speed parameter and the uniform-speed torque distribution coefficient  ⌒ 101 determining a first acceleration distribution coefficient according to the longitudinal acceleration, yaw rate, and target deviation value, and the third corresponding relationship   102a ⌒ determining a second acceleration distribution coefficient according to the lateral acceleration and vehicle speed, and the fourth corresponding relationship  ⌒102b determining a first weight coefficient of the uniform-speed torque distribution coefficient and a second weight coefficient of the acceleration torque distribution coefficient according to an acceleration of the vehicle and a weight coefficient corresponding relationship  ⌒ 103 obtaining a target torque distribution coefficient by performing a weight processing on the uniform-speed torque distribution coefficient and the acceleration torque distribution coefficient according to the first weight coefficient and the second weight coefficient  ⌒ 104

FIG. 5

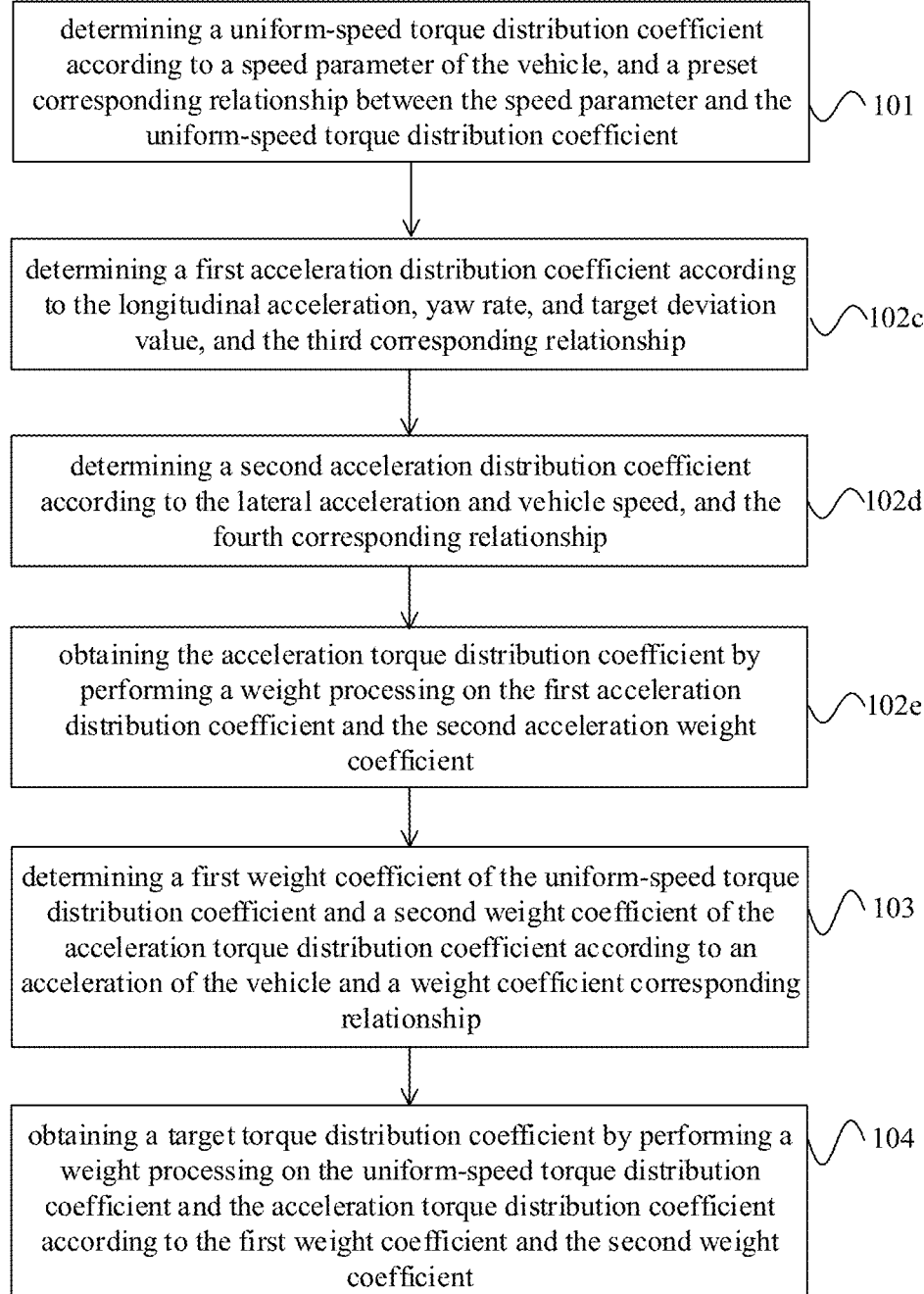

determining a uniform-speed torque distribution coefficient according to a speed parameter of the vehicle, and a preset corresponding relationship between the speed parameter and the uniform-speed torque distribution coefficient      101 determining a first acceleration distribution coefficient according to the longitudinal acceleration, yaw rate, and target deviation value, and the third corresponding relationship      102c determining a second acceleration distribution coefficient according to the lateral acceleration and vehicle speed, and the fourth corresponding relationship      102d obtaining the acceleration torque distribution coefficient by performing a weight processing on the first acceleration distribution coefficient and the second acceleration weight coefficient      102e determining a first weight coefficient of the uniform-speed torque distribution coefficient and a second weight coefficient of the acceleration torque distribution coefficient according to an acceleration of the vehicle and a weight coefficient corresponding relationship      103 obtaining a target torque distribution coefficient by performing a weight processing on the uniform-speed torque distribution coefficient and the acceleration torque distribution coefficient according to the first weight coefficient and the second weight coefficient      104

FIG. 6

VEHICLE TORQUE DISTRIBUTION METHOD, VEHICLE, AND STORAGE MEDIUM

CROSS-REFERENCE TO RELATED APPLICATIONS

This application is a national phase entry under 35 U.S.C. § 371 of International Application No. PCT/CN2023/093033, filed on May 9, 2023, which claims priority to Chinese Patent Application No. 202210506923.9, filed on May 10, 2022, the entire disclosures of which are hereby incorporated herein by reference.

TECHNICAL FIELD

The disclosure relates to the field of automobile technologies, and particularly to a method for distributing a torque in a vehicle, a vehicle, and a storage medium.

BACKGROUND

With the ongoing development of the automobile industry, two-wheel drive vehicles are increasingly unable to satisfy user demands. Users now tend to favor four-wheel drive vehicles due to their superior off-road capabilities and enhanced control performances.

Existing four-wheel drive vehicles generally distribute torque based on the driver's demanded torque and the vehicle's speed, but they may not promptly adjust the torque distribution coefficient of the vehicle during the vehicle's operation across various work conditions (such as uniform-speed straight-line driving, acceleration straight-line driving, longitudinal uniform-speed turning, longitudinal acceleration turning), which impacts the vehicle's stability across different work conditions, especially during turns where the untimely modification of the torque distribution coefficient may lead to the increased instability.

SUMMARY

In a first aspect, a method for distributing a torque in a vehicle is provided according to embodiments of the disclosure. The method includes: determining a uniform-speed torque distribution coefficient according to a speed parameter of the vehicle, and a preset corresponding relationship between the speed parameter and the uniform-speed torque distribution coefficient, in which the uniform-speed torque distribution coefficient is a torque distribution coefficient of the vehicle in a uniform-speed state; determining an acceleration torque distribution coefficient according to the speed parameter of the vehicle, and a preset corresponding relationship between the speed parameter and the acceleration torque distribution coefficient, in which the acceleration torque distribution coefficient is a torque distribution coefficient of the vehicle in an acceleration state; determining a first weight coefficient of the uniform-speed torque distribution coefficient and a second weight coefficient of the acceleration torque distribution coefficient according to an acceleration of the vehicle and a weight coefficient corresponding relationship, in which the weight coefficient corresponding relationship includes a preset corresponding relationship between the acceleration and the first weight coefficient and second weight coefficient; and obtaining a target torque distribution coefficient by performing a weight processing on the uniform-speed torque distribution coefficient and the acceleration torque distribution coefficient according to the first weight coefficient and the second weight coefficient.

In a second aspect, a vehicle including a processor and a memory is provided according to embodiments of the disclosure. The processor is configured to execute a computer program stored in the memory. When the computer program is executed by the processor, steps of any one method provided in the first aspect are implemented.

In a third aspect, a non-transitory computer-readable storage medium storing a computer program is provided according to embodiments of the disclosure. When the computer program is executed by a processor, steps of any one method provided in the first aspect are implemented.

BRIEF DESCRIPTION OF THE DRAWINGS

The drawings herein are incorporated into the specification and constitute a part of the specification, show embodiments in conformity with the disclosure, and explain the principle of the disclosure together with the specification.

To explain technical solutions according to embodiments of the disclosure or the related art more clearly, the drawings described according to the embodiments or the related art will be briefly introduced below; Obviously, those skilled in the art may obtain other drawings based on the drawings without any creative work.

FIG. 1 is a flowchart illustrating a method for distributing a torque of a vehicle according to embodiments of the disclosure.

FIG. 2 is a flowchart illustrating another method for distributing a torque of a vehicle according to embodiments of the disclosure.

FIG. 3 is a flowchart illustrating still another method for distributing a torque of a vehicle according to embodiments of the disclosure.

FIG. 4 is a flowchart illustrating still another method for distributing a torque of a vehicle according to embodiments of the disclosure.

FIG. 5 is a flowchart illustrating still another method for distributing a torque of a vehicle according to embodiments of the disclosure.

FIG. 6 is a flowchart illustrating still another method for distributing a torque of a vehicle according to embodiments of the disclosure.

DETAILED DESCRIPTION

Figure 7:
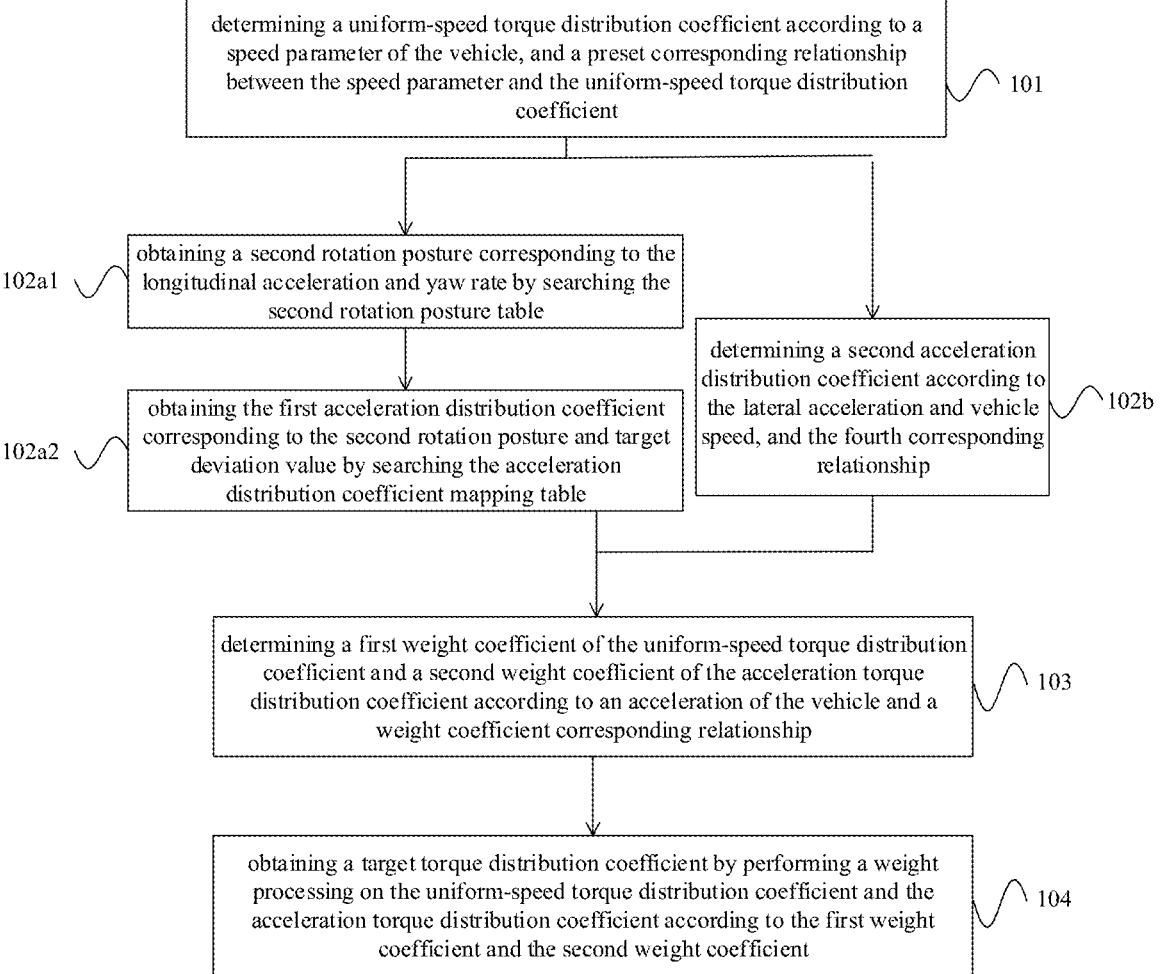
FIG. 7 is a flowchart illustrating still another method for distributing a torque of a vehicle according to embodiments of the disclosure.

To understand the above purposes, features, and advantages according to embodiments of the disclosure more clearly, solutions according to embodiments of the disclosure may be further described below. It should be noted that, embodiments of the disclosure may be combined with features in the embodiments without conflict.

Numerous specific details are set forth in the following description to facilitate a thorough understanding of the embodiments of the disclosure. However, the embodiments of the disclosure may also be implemented in different ways other than those described herein; obviously, embodiments in the specification are only a part of embodiments of the disclosure rather than all embodiments.

In the description and claims of the disclosure, relationship terms such as "first" and "second" are used to distinguish one entity or operation from another entity or operation without necessarily requiring or implying any such actual relationship or order between such entities or operations. Terms "comprising/including" or any other variations thereof, are intended to cover a non-exclusive inclusion, such that a process, a method, an article, or a device including a series of elements not only includes those elements but also includes other elements not expressly listed, or may further include elements inherent to such process, method, article, or device. In the absence of more constraints, the elements defined by a sentence "comprising one" do not preclude the presence of additional same elements in the process, method, article, or device that includes the elements. In addition, "and/or" in the description and the claims represents at least one of connected objects. The character "/" generally means the contextual object is a kind of "or" relationship.

A method for distributing a torque in a vehicle according to embodiments of the disclosure are described according to several embodiments below in combination with the attached drawings.

FIG. 1 is a flowchart illustrating a method for distributing a torque of a vehicle according to embodiments of disclosure. The method is applicable to a vehicle. The method for distributing the torque of the vehicle according to embodiments of disclosure are illustrated below. The method may include step 101 to step 104.

At 101, a uniform-speed torque distribution coefficient is determined according to a speed parameter of the vehicle, and a preset corresponding relationship between the speed parameter and the uniform-speed torque distribution coefficient.

The uniform-speed torque distribution coefficient is a torque distribution coefficient of the vehicle in a uniform-speed state.

It may be understood that, the preset corresponding relationship between the speed parameter and the uniform-speed torque distribution coefficient may be represented by a functional relation formula or may be represented in the form of a table. The specific functional relation formula and the table are obtained according to massive experimental data, which will not be limited according to embodiments of the disclosure.

At 102, an acceleration torque distribution coefficient is determined according to the speed parameter of the vehicle, and a preset corresponding relationship between the speed parameter and the acceleration torque distribution coefficient.

The acceleration torque distribution coefficient is a torque distribution coefficient of the vehicle in an acceleration state.

It may be understood that, the preset corresponding relationship between the speed parameter and the acceleration torque distribution coefficient may be represented by a functional relation formula or may be represented in the form of a table. The specific functional relation formula and the table are obtained according to massive experimental data, which will not be limited according to embodiments of the disclosure.

It may be understood that, the speed parameter includes a vehicle speed, a longitudinal acceleration, a lateral acceleration, a yaw rate, and a deviation value between the yaw rate and a yaw rate safety interval.

The vehicle speed, the longitudinal acceleration, the lateral acceleration, and the yaw rate may be real-time data of the vehicle in driving, or may be an average of data of the vehicle within a period of time. For example, the vehicle speed is an average speed of the vehicle within five minutes, and the longitudinal acceleration is an average longitudinal acceleration of the vehicle within five minutes. However, the torque distribution coefficient determined according to the real-time data of the vehicle in driving is more time-sensitive.

It may be understood that, there are a front-axle motor and a rear-axle motor in the four-wheel drive vehicle. Torque distribution refers to distribution of a torque of the front-axle motor and a torque of the rear-axle motor. The vehicle may adjust the torque distribution at different speeds under different road conditions, to reduce problems such as insufficient power for climbing, understeer, or oversteer.

It may be understood that the torque distribution coefficient may indicate a torque distributed to the front axle or a torque distributed to the rear axle, which will not be limited according to embodiments of the disclosure.

For example, a requested torque is 100 and a determined torque distribution coefficient is 60. When the torque distribution coefficient indicates the torque distributed to the rear axle, the torque distributed to the rear-axle motor is 60. Correspondingly, according to the requested torque, it may be determined that the torque distributed to the front axle is: the requested torque—the torque distribution coefficient=100−60=40.

At 103, a first weight coefficient of the uniform-speed torque distribution coefficient, and a second weight coefficient of the acceleration torque distribution coefficient are determined according to an acceleration of the vehicle and a weight coefficient corresponding relationship.

The weight coefficient corresponding relationship includes a preset corresponding relationship between the acceleration and the first weight coefficient and second weight coefficient.

It may be understood that, the preset corresponding relationship between the acceleration and the first weight coefficient and second weight coefficient may be represented by a functional relation formula or may be represented in the form of a table. The specific functional relation formula and the table are obtained according to massive experimental data, which will not be limited according to embodiments of the disclosure.

It may be understood that the acceleration of the vehicle may be the longitudinal acceleration, or may be an acceleration obtained according to the lateral acceleration and the longitudinal acceleration, or may be an acceleration obtained according to the lateral acceleration, the longitudinal acceleration, and a vertical acceleration, which are determined according to actual needs, and will not be limited according to embodiments of the disclosure.

It may be understood that a sum of the first weight coefficient and the second weight coefficient is 1. When the acceleration of the vehicle is greater than or equal to an acceleration determination threshold, it means that the vehicle is accelerating, the first weight coefficient is 0, and the second weight coefficient is 1; when the acceleration of the vehicle is less than or equal to a uniform-speed determination threshold, it means that the vehicle is driving at a uniform-speed, the first weight coefficient is 1, and the second weight coefficient is 0; when the acceleration of the vehicle is less than the acceleration determination threshold and greater than the uniform-speed determination threshold, the first weight coefficient and the second weight coefficient are determined according to a preset ratio or according to a preset equation. The preset ratio or the preset formula is used to represent a ratio between the first weight coefficient and the second weight coefficient. The specific acceleration determination threshold, the uniform-speed determination threshold, and the preset ratio are determined according to actual needs, which are not limited according to embodiments of the disclosure.

For example, the acceleration determination threshold is 1, the uniform-speed determination threshold is 0.5, and the preset equation is $(a-a_1)/(a_2-a)$, where a is an actual acceleration, $a_1$ is the uniform-speed determination threshold, and $a_2$ is the acceleration determination threshold. When the acceleration is greater than or equal to 1, the first weight coefficient is 0 and the second weight coefficient is 1. When the acceleration is less than or equal to 0.5, the first weight coefficient is 1 and the second weight coefficient is 0. When the acceleration is greater than 0.5 and less than 1, for example, when the acceleration is 0.6, the first weight coefficient is 0.8 and the second weight coefficient is 0.2. When the acceleration is 0.7, the first weight coefficient is 0.6 and the second weight coefficient is 0.4. When the acceleration is 0.8, the first weight coefficient is 0.4 and the second weight coefficient is 0.6. When the acceleration is 0.9, the first weight coefficient is 0.2 and the second weight coefficient is 0.8.

At 104, a target torque distribution coefficient is obtained by performing a weight processing on the uniform-speed torque distribution coefficient and the acceleration torque distribution coefficient according to the first weight coefficient and the second weight coefficient.

It may be understood that, the target torque distribution coefficient=first weight coefficient×uniform-speed torque distribution coefficient+second weight coefficient×acceleration torque distribution coefficient.

According to embodiments of the disclosure, the uniform-speed torque distribution coefficient is determined according to the speed parameter of the vehicle, and the preset corresponding relationship between the speed parameter and the uniform-speed torque distribution coefficient. The uniform-speed torque distribution coefficient is a torque distribution coefficient of the vehicle in the uniform-speed state. The acceleration torque distribution coefficient is determined according to the speed parameter of the vehicle, and the preset corresponding relationship between the speed parameter and the acceleration torque distribution coefficient. The acceleration torque distribution coefficient is the torque distribution coefficient of the vehicle in the acceleration state. The first weight coefficient of the uniform-speed torque distribution coefficient and the second weight coefficient of the acceleration torque distribution coefficient are determined according to the acceleration of the vehicle and the weight coefficient corresponding relationship. The weight coefficient corresponding relationship includes the preset corresponding relationship between the acceleration and the first weight coefficient and second weight coefficient. The target torque distribution coefficient is obtained by performing the weight processing on the uniform-speed torque distribution coefficient and the acceleration torque distribution coefficient according to the first weight coefficient and second weight coefficient. In the actual driving process of the vehicle, to ensure the driving stability under different work conditions (such as uniform-speed straight-line driving, acceleration straight-line driving, longitudinal uniform-speed turning, longitudinal acceleration turning), it is necessary to configure different torque distribution coefficients for the vehicle. Therefore, in the solutions, the uniform-speed torque distribution coefficient and the acceleration torque distribution coefficient are determined according to the speed parameter of the vehicle in the current driving state, and the weight coefficient corresponding to the uniform-speed torque distribution coefficient and the weight coefficient corresponding to the acceleration torque distribution coefficient are determined according to the acceleration of the vehicle, and the target torque distribution coefficient is finally obtained by weighting, that is, a real-time adjustment of torque distribution is realized by considering the speed parameter and the acceleration of the vehicle from different aspects of uniform-speed and acceleration, ensuring that the front and rear axle torque distribution for the vehicle under various work conditions is more rational, ultimately enhancing the overall driving stability; Importantly, it helps reduce the risk of vehicle instability due to oversteer or understeer during turns, thereby contributing to the safer driving.

According to some embodiments, in combination with FIG. 1, as illustrated in FIG. 2, the step 101 specifically may be achieved by step 101*a* or step 101*b*.

At step 101*a*, a first uniform-speed distribution coefficient is determined according to the longitudinal acceleration, yaw rate, and target deviation value, and the first corresponding relationship.

The first corresponding relationship includes a preset corresponding relationship between the longitudinal acceleration, yaw rate, and target deviation value, and the first uniform-speed distribution coefficient. The first uniform-speed distribution coefficient is the uniform-speed torque distribution coefficient. The target deviation value is a deviation value between the yaw rate and a yaw rate safety interval.

It may be understood that, there is the preset corresponding relationship between the longitudinal acceleration, yaw rate, and target deviation value, and the first uniform-speed distribution coefficient. One torque distribution coefficient may be determined uniquely according to the longitudinal acceleration, the yaw rate, and the target deviation value, that is, the first uniform-speed distribution coefficient. The corresponding relationship between the longitudinal acceleration, yaw rate, and target deviation value, and the first uniform-speed distribution coefficient is a torque distribution coefficient with better stability of the vehicle obtained according to massive experiments.

Specifically, the first corresponding relationship between the longitudinal acceleration, yaw rate, and target deviation value, and the first uniform-speed distribution coefficient may be represented by a functional relation formula or may be represented in the form of a table. The specific functional relation formula and the table are obtained according to massive experimental data, which will not be limited according to embodiments of the disclosure.

For example, Table 1 illustrates a corresponding relationship between the longitudinal acceleration, yaw rate, and target deviation value, and the first uniform-speed distribution coefficient.

TABLE 1

| First Corresponding Relationship | | | | |
|---|---|---|---|---|
| parameter | longitudinal acceleration | yaw rate | target deviation value | first uniform-speed distribution coefficient |
| parameter value | xxx | xxx | xxx | xxx |

It may be understood that, if the corresponding relationship between the longitudinal acceleration, yaw rate, and target deviation value, and the first uniform-speed distribution coefficient is reflected in the form of the table. When there is no data in the table completely same as one of the longitudinal acceleration, the yaw rate, and the target deviation value when searching the table, one piece of data closest to one of the longitudinal acceleration, the yaw rate, and the target deviation value may be found, or at least two pieces of data closest to one of the longitudinal acceleration, the yaw rate, or the target deviation value may be found first, and the two pieces of data are processed (such as weighting) to obtain processed data, and the table is searched based on the processed data, specifically, which is not limited according to embodiments of the disclosure.

It may be understood that the longitudinal acceleration and the yaw rate of the vehicle may be a real-time longitudinal acceleration and a real-time yaw rate of the vehicle, or may be an average of the longitudinal acceleration and an average of the yaw rate within a period of time.

It may be understood that the longitudinal acceleration of the vehicle refers to an acceleration along an axial direction of the vehicle (that is, an acceleration in forward and backward directions of the vehicle).

It may be understood that the yaw angle refers to an angle at which the vehicle rotates around a Z-axis perpendicular to the ground. The yaw rate is a rate of change of the angle, also known as the yaw rate. The size of the yaw angle may indicate the stability of the vehicle.

It may be understood that the deviation value between the yaw rate and a yaw rate safety interval refers to a part of the yaw rate of the vehicle being greater than an upper limit of the yaw rate safety interval or a part of the yaw rate of the vehicle being less than a lower limit of the yaw rate safety interval.

For example, the yaw rate safety interval is [5-10]. If the yaw rate of the vehicle is 2, the deviation value is 5−2=3. If the yaw rate of the vehicle is 11, the deviation value is 11−1=10. If the yaw rate of the vehicle is 7, then the deviation value is 0 in the yaw rate safety interval.

At step 101*b*, a second uniform-speed distribution coefficient is determined according to the lateral acceleration and vehicle speed, and the second corresponding relationship.

The second corresponding relationship includes a preset corresponding relationship between the lateral acceleration and vehicle speed, and the second uniform-speed distribution coefficient. The second uniform-speed distribution coefficient is the uniform-speed torque distribution coefficient.

Specifically, the preset corresponding relationship between the lateral acceleration and vehicle speed, and the second uniform-speed distribution coefficient may be represented by a functional relation formula or may be represented in the form of a table. The specific functional relation formula and the table are obtained according to massive experimental data, which will not be limited according to embodiments of the disclosure.

For example, the preset corresponding relationship between the lateral acceleration and vehicle speed, and the second uniform-speed distribution coefficient may be a two-dimensional MAP diagram, and specifically may refer to Table 2.

It may be understood that, there is the corresponding relationship between the lateral acceleration and vehicle speed, and the second uniform-speed distribution coefficient. One torque distribution coefficient may be uniquely determined according to the lateral acceleration and the vehicle speed, that is, the second uniform-speed distribution coefficient. The corresponding relationship between the lateral acceleration and vehicle speed, and the second uniform-speed distribution coefficient is a torque distribution coefficient with better stability of the vehicle obtained according to massive experiments.

Specifically, the corresponding relationship between the lateral acceleration and vehicle speed, and the second uniform-speed distribution coefficient may be represented by a functional relation formula or may be represented in the form of a table, which will not be limited according to embodiments of the disclosure.

It may be understood that, if the corresponding relationship between the lateral acceleration and vehicle speed, and the second uniform-speed distribution coefficient is reflected in the form of the table, when there is no data in the table completely same as one of the lateral acceleration and the vehicle speed when searching the table, one piece of data closest to one of the lateral acceleration and the vehicle speed may be found, or at least two pieces of data closest to one of the lateral acceleration and the vehicle speed may be found first, and the two pieces of data are processed (such as weighting) to obtain processed data, and the table is searched based on the processed data, specifically, which is not limited according to embodiments of the disclosure.

It may be understood that the lateral acceleration and the vehicle speed may be a real-time lateral acceleration and a real-time vehicle speed of the vehicle, or may be an average of the lateral acceleration and an average of the vehicle speed within a period of time.

It may be understood that the lateral acceleration of the vehicle refers to an acceleration in a direction perpendicular to an axial direction of the vehicle (that is, an acceleration in a left-right direction of the vehicle), and is an acceleration caused by a centrifugal force generated when the vehicle is turning. If the lateral acceleration is too large, the vehicle will easily deviate from a driving path.

According to embodiments of the disclosure, when the speed parameter includes the longitudinal acceleration, the yaw rate, and the target deviation value, determining the uniform-speed torque distribution coefficient according to the speed parameter of the vehicle, and the preset corresponding relationship between the speed parameter and the uniform-speed torque distribution coefficient includes: determining the first uniform-speed distribution coefficient according to the longitudinal acceleration, yaw rate, and target deviation value, and the first corresponding relationship. The first corresponding relationship includes the preset corresponding relationship between the longitudinal acceleration, yaw rate, and target deviation value, and the first uniform-speed distribution coefficient. The first uniform-speed distribution coefficient is the uniform-speed distribution coefficient. The target deviation value is a minimum deviation value between the yaw rate and the yaw rate safety interval. When the speed parameter includes the lateral acceleration and the vehicle speed, determining the uniform-speed torque distribution coefficient according to the speed parameter of the vehicle, and the preset corresponding relationship between the speed parameter and the uniform-speed torque distribution coefficient includes: determining the second uniform-speed distribution coefficient according to the lateral acceleration and vehicle speed, and the second corresponding relationship. The second corresponding relationship includes the preset corresponding relationship between the lateral acceleration and vehicle speed, and the second uniform-speed distribution coefficient. The second uniform-speed distribution coefficient is the uniform-speed torque distribution coefficient. Therefore, the torque distribution coefficient of the vehicle is determined according to each speed parameter of the vehicle, and the torque distribution coefficient of the front-axle and the front-axle of the vehicle is adjusted in time to reduce a risk of vehicle instability during driving through a reasonable torque distribution.

According to some embodiments, in combination with FIG. 1, as illustrated in FIG. 3, the step 101 specifically may be achieved by step 101c to step 101e.

At step 101c, a first uniform-speed distribution coefficient is determined according to the longitudinal acceleration, yaw rate, and target deviation value, and the first corresponding relationship.

The first corresponding relationship includes a preset corresponding relationship between the longitudinal acceleration, yaw rate, and target deviation value, and the first uniform-speed distribution coefficient, and the target deviation value is a minimum deviation value between the yaw rate and a yaw rate safety interval.

At step 101d, a second uniform-speed distribution coefficient is determined according to the lateral acceleration and vehicle speed, and the second corresponding relationship.

The second corresponding relationship includes a preset corresponding relationship between the lateral acceleration and vehicle speed, and the second uniform-speed distribution coefficient.

At step 101e, the uniform-speed torque distribution coefficient is obtained by performing a weight processing on the first uniform-speed distribution coefficient and the second uniform-speed weight coefficient.

It may be understood that, when the weight processing is performed on the first uniform-speed distribution coefficient and the second uniform-speed distribution coefficient, a weight sum of the first uniform-speed distribution coefficient and the second uniform-speed distribution coefficient is 1. For example, a weight coefficient of the first uniform-speed distribution coefficient is 0.2 during weighting, and a weight coefficient of the second uniform-speed distribution coefficient is: 1−0.2=0.8.

It may be understood that the weight coefficient of the first uniform-speed distribution coefficient and the weight coefficient of the second uniform-speed distribution coefficient may be determined based on the principle of taking a larger uniform-speed torque distribution coefficient (that is, a larger weight coefficient in the first uniform-speed distribution coefficient and the second uniform-speed distribution coefficient is 1, and a smaller weight coefficient is 0), or may be determined based on the principle of taking a smaller uniform-speed torque distribution coefficient (that is, a smaller weight coefficient in the first uniform-speed distribution coefficient and the second uniform-speed distribution coefficient is 1, and a larger weight coefficient is 0), or the weight coefficient of the first uniform-speed distribution coefficient and the weight coefficient of the second uniform-speed distribution coefficient may be distributed according to a fixed ratio. The weight coefficient of the first uniform-speed distribution coefficient and the weight coefficient of the second uniform-speed distribution coefficient may be dynamically determined based on different driving states. For example, when the vehicle is going straight, a weight coefficient ratio of the larger distribution coefficient to the smaller distribution coefficient in the first uniform-speed distribution coefficient and the second uniform-speed distribution coefficient is 5:3. When the vehicle turns, the weight coefficient ratio of the larger distribution coefficient to the smaller distribution coefficient in the first uniform-speed distribution coefficient and the second uniform-speed distribution coefficient is 4:1. Specifically, the weight coefficient of the first uniform-speed distribution coefficient and the weight coefficient of the second uniform-speed distribution coefficient are determined according to actual needs, which are not limited according to embodiments of the disclosure.

For example, taking the torque distribution coefficient being a torque distribution of the rear axle for example, the first uniform-speed distribution coefficient is 40, and the second uniform-speed distribution coefficient is 60. Based on the principle of taking the larger uniform-speed torque distribution coefficient, the uniform-speed distribution coefficient may be obtained: 0×40+1×60=60. Based on the principle of taking the smaller uniform-speed torque distribution coefficient, the uniform-speed torque distribution coefficient may be obtained: 1×40+0×60=40. Based on the principle of distributing the weight coefficient of the first uniform-speed distribution coefficient and the weight coefficient of the second uniform-speed distribution coefficient according to a fixed ratio, for example, when the weight coefficient ratio of the larger distribution coefficient to the smaller distribution coefficient in the first uniform distribution coefficient and the second uniform distribution coefficient is 3:1, the uniform-speed torque distribution coefficient is: 0.75×60+0.25×40=55.

According to some embodiments, the speed parameter includes the longitudinal acceleration, the yaw rate, the target deviation value, the lateral acceleration, and the vehicle speed; determining the uniform-speed torque distribution coefficient according to the speed parameter of the vehicle, and the preset corresponding relationship between the speed parameter and the uniform-speed torque distribution coefficient includes: determining a first uniform-speed distribution coefficient according to the longitudinal acceleration, yaw rate, and target deviation value, and the first corresponding relationship, in which the first corresponding relationship includes a preset corresponding relationship between the longitudinal acceleration, yaw rate, and target deviation value, and the first uniform-speed distribution coefficient, and the target deviation value is a minimum deviation value between the yaw rate and a yaw rate safety interval; determining a second uniform-speed distribution coefficient according to the lateral acceleration and vehicle speed, and the second corresponding relationship, in which the second corresponding relationship includes a preset corresponding relationship between the lateral acceleration and vehicle speed, and the second uniform-speed distribution coefficient; and obtaining the uniform-speed torque distribution coefficient by performing a weight processing on the first uniform-speed distribution coefficient and the second uniform-speed weight coefficient. Therefore, the uniform-speed torque distribution coefficient consideration obtained by performing the weight processing on the first uniform-speed distribution coefficient and the second uniform-speed weight coefficient is more comprehensive, and the uniform-speed torque distribution coefficient is more reasonable, which enhances the stability of the vehicle driving.

According to some embodiments, in combination with FIG. 2, as illustrated in FIG. 4, the step 101a specifically may be achieved by step 101a1 and step 101a2.

At 101a1, a first rotation posture corresponding to the longitudinal acceleration and yaw rate is obtained by searching the first rotation posture table.

It may be understood that, the first rotation posture may be uniquely determined according to the longitudinal acceleration and the yaw rate.

For example, the longitudinal acceleration, the yaw rate, and the first rotation posture may be a two-dimensional MAP diagram (for a uniform-speed). As illustrated in Table 2, for example, a range of the longitudinal acceleration is [a-b], a range of the yaw rate is [C-D], the determined first rotation posture is a posture 2, and the posture is the first rotation posture.

TABLE 2

First Rotation Posture Table (Uniform-speed)

| | yaw rate | |
|---|---|---|
| longitudinal acceleration | [A-B] | [C-D] |
| | posture | |
| [a-b] | posture 1 | posture 2 |
| [c-d] | posture 3 | posture 4 |

It needs to be noted that, the preset corresponding relationship between the longitudinal acceleration, the yaw rate, and the first rotation posture may be obtained according to massive experiments.

At 101a2, the first uniform-speed distribution coefficient corresponding to the first rotation posture and target deviation value is obtained by searching the uniform-speed distribution coefficient mapping table.

It may be understood that, the first uniform-speed distribution coefficient may be uniquely determined according to the first rotation posture and target deviation value.

For example, the uniform-speed distribution coefficient mapping table may be a two-dimensional MAP diagram. As illustrated in Table 3, the first uniform-speed distribution coefficient may be determined according to the first rotation posture and target deviation value. The distribution coefficient in Table 3 is the first uniform-speed distribution coefficient. The posture is the first rotation posture.

TABLE 3

Uniform-speed Distribution Coefficient Mapping Table

| | target deviation value | |
|---|---|---|
| | 1 | 2 |
| posture | distribution coefficient | |
| posture 1 | XXX | XXX |
| posture 2 | XXX | XXX |

It needs to be noted that, the preset corresponding relationship between the first rotation posture, the target deviation value, and the first uniform-speed distribution coefficient may be obtained according to massive experiments.

According to some embodiments, the first corresponding relationship includes the first rotation posture table and the uniform-speed distribution coefficient mapping table. Determining the first uniform-speed distribution coefficient according to the longitudinal acceleration, yaw rate, and target deviation value, and the first corresponding relationship, includes: obtaining the first rotation posture corresponding to the longitudinal acceleration and the yaw rate by searching the first rotation posture table; and obtaining the first uniform-speed distribution coefficient corresponding to the first rotation posture and the target deviation value by searching the uniform-speed distribution coefficient mapping table. Therefore, a corresponding uniform-speed distribution coefficient may be searched in the form of a mapping table, which is more convenient to use, and higher in search efficiency.

According to some embodiments, in combination with FIG. 1, as illustrated in FIG. 5, the step 102 specifically may be achieved by step 102a or step 102b.

At step 102a, a first acceleration distribution coefficient is determined according to the longitudinal acceleration, yaw rate, and target deviation value, and a third corresponding relationship.

The third corresponding relationship includes a preset corresponding relationship between the longitudinal acceleration, yaw rate, and target deviation value, and the first acceleration distribution coefficient. The first acceleration distribution coefficient is an acceleration torque distribution coefficient. The target deviation value is a deviation value between the yaw rate and a yaw rate safety interval.

Specifically, the preset corresponding relationship between the longitudinal acceleration, yaw rate, and target deviation value, and the first acceleration distribution coefficient may be represented by a functional relation formula or may be represented in the form of a table. The specific functional relation formula and the table are obtained according to massive experimental data, which will not be limited according to embodiments of the disclosure.

It may be understood that, there is the corresponding relationship between the longitudinal acceleration, yaw rate, and target deviation value, and the first acceleration distribution coefficient. One torque distribution coefficient may be uniquely determined according to the longitudinal acceleration, the yaw rate, and the target deviation value, that is, the first acceleration distribution coefficient. The corresponding relationship between the longitudinal acceleration, yaw rate, and target deviation value, and the first acceleration distribution coefficient is a torque distribution coefficient with better stability of the vehicle obtained according to massive experiments.

It may be understood that, if the corresponding relationship between the longitudinal acceleration, yaw rate, and target deviation value, and the first acceleration distribution coefficient is reflected in the form of a table, when there is no data in the table completely same as one of the longitudinal acceleration, the yaw rate, and the target deviation value when searching the table, one piece of data closest to one of the longitudinal acceleration, the yaw rate, and the target deviation value may be found, or at least two pieces of data closest to one of the longitudinal acceleration, the yaw rate, and the target deviation value may be found first, and the two pieces of data are processed (such as weighting) to obtain processed data, and the table is searched based on the processed data, specifically, which is not limited according to embodiments of the disclosure.

At step 102b, a second acceleration distribution coefficient is determined according to the lateral acceleration and vehicle speed, and a fourth corresponding relationship.

The fourth corresponding relationship includes a preset corresponding relationship between the lateral acceleration and vehicle speed, and the second acceleration distribution coefficient. The second acceleration distribution coefficient is the acceleration torque distribution coefficient.

It may be understood that the preset corresponding relationship between the lateral acceleration and vehicle speed, and the second uniform-speed distribution coefficient may be represented by a functional relation formula or may be represented in the form of a table. The specific functional relation formula and the table are obtained according to massive experimental data, which will not be limited according to embodiments of the disclosure.

It may be understood that, there is the corresponding relationship between the lateral acceleration and vehicle speed, and the second acceleration distribution coefficient. One torque distribution coefficient may be uniquely determined according to the lateral acceleration and the vehicle speed, that is, the second acceleration distribution coefficient. The corresponding relationship between the lateral acceleration and vehicle speed, and the second acceleration distribution coefficient is a torque distribution coefficient with better stability of the vehicle obtained according to massive experiments.

It may be understood that, if the corresponding relationship between the lateral acceleration and vehicle speed, and the second acceleration distribution coefficient is reflected in the form of a table, when there is no data in the table completely same as any one of the lateral acceleration and vehicle speed when searching the table, one piece of data closest to one of the lateral acceleration and vehicle speed may be found, or at least two pieces of data closest to one of the lateral acceleration and vehicle speed may be found first, and the two pieces of data are processed (such as weighting) to obtain processed data, and the table is searched based on the processed data, specifically, which is not limited according to embodiments of the disclosure.

The specific representation form of the third corresponding relationship and the fourth corresponding relationship may refer to Table 1 by taking the table for example.

According to some embodiments, determining the acceleration torque distribution coefficient according to the speed parameter, and the preset corresponding relationship between the speed parameter and the acceleration torque distribution coefficient includes: determining the first acceleration distribution coefficient according to the longitudinal acceleration, yaw rate, and target deviation value, and the third corresponding relationship, in which the third corresponding relationship includes the preset corresponding relationship between the longitudinal acceleration, yaw rate, and target deviation value, and the first acceleration distribution coefficient, the first acceleration distribution coefficient is the acceleration torque distribution coefficient, and the target deviation value is the deviation value between the yaw rate and the yaw rate safety interval; or, determining the second uniform-speed distribution coefficient according to the lateral acceleration of the vehicle and vehicle speed, and the fourth corresponding relationship, in which the fourth corresponding relationship includes a preset corresponding relationship between the lateral acceleration and vehicle speed, and the second uniform-speed distribution coefficient, and the second acceleration distribution coefficient is the acceleration torque distribution coefficient. Therefore, the torque distribution coefficient of the vehicle is determined according to each speed parameter of the vehicle, and the torque distribution of the front-axle and the front-axle of the vehicle is adjusted in time to reduce a risk of vehicle instability during driving through a reasonable torque distribution.

According to some embodiments, in combination with FIG. 1, as illustrated in FIG. 6, the step 102 specifically may be achieved by step 102c to step 102e.

At step 102c, a first acceleration distribution coefficient is determined according to the longitudinal acceleration, yaw rate, and target deviation value, and the third corresponding relationship.

The third corresponding relationship includes a preset corresponding relationship between the longitudinal acceleration, yaw rate, and target deviation value, and the first acceleration distribution coefficient, and the target deviation value is a deviation value between the yaw rate and a yaw rate safety interval.

At step 102d, a second acceleration distribution coefficient is determined according to the lateral acceleration and vehicle speed, and the fourth corresponding relationship.

The fourth corresponding relationship includes a preset corresponding relationship between the lateral acceleration and vehicle speed, and the second acceleration distribution coefficient.

At step 102e, an acceleration torque distribution coefficient is obtained by performing a weight processing on the first acceleration distribution coefficient and the second acceleration weight coefficient.

It needs to be noted that, a specific process of performing the weight processing on the first acceleration distribution coefficient and the second acceleration weight coefficient may refer to descriptions of the above step 101e, which will not be repeated herein.

According to some embodiments, determining the acceleration torque distribution coefficient according to the speed parameter, and the preset corresponding relationship between the speed parameter and the acceleration torque distribution coefficient includes: determining the first acceleration distribution coefficient according to the longitudinal acceleration, yaw rate, and target deviation value, and the third corresponding relationship, in which the third corresponding relationship includes the preset corresponding relationship between the longitudinal acceleration, yaw rate, and target deviation value, and the first acceleration distribution coefficient, and the target deviation value is the deviation value between the yaw rate and the yaw rate safety interval; determining the second acceleration distribution coefficient according to the lateral acceleration of the vehicle and vehicle speed, and the fourth corresponding relationship, in which the fourth corresponding relationship includes the preset corresponding relationship between the lateral acceleration and vehicle speed, and the second uniform-speed distribution coefficient; and obtaining the acceleration torque distribution coefficient by performing the weight processing on the first acceleration distribution coefficient and the second acceleration weight coefficient. Therefore, the acceleration torque distribution coefficient consideration obtained by performing the weight processing on the first acceleration distribution coefficient and the second acceleration weight coefficient is more comprehensive, and the acceleration torque distribution coefficient obtained is more reasonable, which enhances the stability of the vehicle in driving.

According to some embodiments, in combination with FIG. 5, as illustrated in FIG. 7, the step 102a specifically may be achieved by step 102a1 and step 102a2.

At 102a1, a second rotation posture corresponding to the longitudinal acceleration and the yaw rate is obtained by searching a second first rotation posture table.

It may be understood that, the second rotation posture may be uniquely determined according to the longitudinal acceleration and the yaw rate.

For example, the longitudinal acceleration, the yaw rate, and the second rotation posture may be a second-dimensional MAP diagram (for an acceleration). As illustrated in Table 4, for example, a range of the longitudinal acceleration is [a-b], a range of the yaw rate is [C-D], the determined acceleration rotation posture is posture 6, and the posture is the second rotation posture.

15

TABLE 4

| Second Rotation Posture Table (Acceleration) | | |
| --- | --- | --- |
| | yaw rate | |
| longitudinal acceleration | [A-B] | [C-D] |
| | posture | |
| [a-b] | posture 5 | posture 6 |
| [c-d] | posture 7 | posture 8 |

It needs to be noted that, the preset corresponding relationship between the longitudinal acceleration, the yaw rate, and the second rotation posture may be obtained according to massive experiments.

At 102a2, a first acceleration distribution coefficient corresponding to the second rotation posture and the target deviation value is obtained by searching an acceleration distribution coefficient mapping table.

It may be understood that, the first acceleration distribution coefficient may be uniquely determined according to the second rotation posture and the target deviation value.

For example, the second rotation posture, the target deviation value, and the first acceleration distribution coefficient may be a two-dimensional MAP diagram. As illustrated in Table 5, the distribution coefficient is the first acceleration distribution coefficient, and the posture is the second rotation posture.

TABLE 5

| Acceleration Distribution Coefficient Mapping Table | | |
| --- | --- | --- |
| | target deviation value | |
| | 1 | 2 |
| posture | distribution coefficient | |
| posture 1 | XXX | XXX |
| posture 2 | XXX | XXX |

It needs to be noted that, the preset corresponding relationship between the second rotation posture, the target deviation value, and the first acceleration distribution coefficient may be obtained according to massive experiments.

According to embodiments of the disclosure, the third corresponding relationship includes the second rotation posture table and the acceleration distribution coefficient mapping table. Determining the first acceleration distribution coefficient according to the longitudinal acceleration, yaw rate, and target deviation value and the third corresponding relationship includes: obtaining the second rotation posture corresponding to the longitudinal acceleration and the yaw rate by searching the second rotation posture table; and obtaining the first acceleration distribution coefficient corresponding to the second rotation posture and the target deviation value by searching the acceleration distribution coefficient mapping table. A corresponding acceleration distribution coefficient may be searched in the form of a mapping table, which is more convenient to use, and higher in search efficiency.

According to some embodiments, before the above step 101 and the step 102, the method for distributing the torque in the vehicle according to embodiments of the disclosure further includes step 105.

At 105, the yaw rate safety interval is calculated according to the road adhesion coefficient and the vehicle speed.

It may be understood that, the road adhesion coefficient refers to an adhesion capacity size of tires on different roads, and adhesion coefficients on different roads are different.

A calculation equation of the yaw rate safety interval is:

$$w_{max} = \frac{g \times |\mu_{max}|}{V_x} \times K$$

$$w_{min} = -\frac{g \times |\mu_{min}|}{V_x} \times K$$

where, $w_{max}$ is a maximum value of a yaw rate, g is a gravitational acceleration, $\mu_{max}$ is a maximum adhesion coefficient of a current road surface, $V_x$ is a longitudinal vehicle speed, $\mu_{min}$ is a minimum adhesion coefficient of a current road surface, $w_{min}$ is a minimum value of a yaw rate, and K is a coefficient determined by searching a table according to a vehicle speed. The lower the vehicle speed is, the larger the K value is, and the higher the vehicle speed is, the smaller the K value is.

According to embodiments of the disclosure, the yaw rate safety interval is calculated according to the road adhesion coefficient and the vehicle speed. Considering the vehicle speed and adhesion coefficients of different roads, the determined yaw rate safety interval is more accurate.

According to some embodiments, the step 104, specifically may be achieved by step 104a and step 104b.

At 104a, the correction acceleration is obtained by correcting the longitudinal acceleration and the weight coefficient corresponding relationship according to the longitudinal acceleration, steering wheel angle, and yaw rate of the vehicle, and a fifth corresponding relationship.

The fifth corresponding relationship includes a preset corresponding relationship between the longitudinal acceleration, steering wheel angle, and yaw rate, and the correction acceleration.

It may be understood that, the preset corresponding relationship between the longitudinal acceleration, steering wheel angle, and yaw rate, and the correction acceleration may be represented by a functional relation formula or may be represented in the form of a table. The specific functional relation formula and the table are obtained according to massive experimental data, which will not be limited according to embodiments of the disclosure.

It may be understood that, the preset corresponding relationship between the longitudinal acceleration, steering wheel angle, and yaw rate, and the correction acceleration may be determined according to a functional relation formula or may be represented in the form of a table, which will not be limited according to embodiments of the disclosure.

It will be appreciated that when the vehicle is actually running, and when the vehicle speed is relatively stable, an acceleration acquired by a sensor on the vehicle is not accurate enough, and an acquired value of the sensor is affected by pitching of a vehicle body. Therefore, the influence of the sensor needs to be corrected.

Illustratively, a correction value determined according to the longitudinal acceleration, the steering wheel angle, and the yaw rate of the vehicle is 0.2, and an acceleration value of the vehicle is 5, in which case, the corrected acceleration value is 5.2.

At 104b, the first weight coefficient and second weight coefficient are determined according to the correction acceleration.

It may be understood that a sum of the first weight coefficient and second weight coefficient is 1. When the correction acceleration of the vehicle is greater than or equal to an acceleration determination threshold, it means that the vehicle is accelerating, the first weight coefficient is 0, and the second weight coefficient is 1. When the acceleration of the vehicle is less than or equal to a uniform-speed determination threshold, it means that the vehicle is driving at the uniform-speed, the first weight coefficient is 1, and the second weight coefficient is 0. When the acceleration of the vehicle is less than the acceleration determination threshold and greater than the uniform-speed determination threshold, the first weight coefficient and second weight coefficient are determined according to a preset ratio. The specific acceleration determination threshold, the uniform-speed determination threshold, and the preset ratio are determined according to actual needs, which are not limited according to embodiments of the disclosure.

According to embodiments of the disclosure, the correction acceleration is obtained by correcting the longitudinal acceleration according to the longitudinal acceleration, the steering wheel angle, and the yaw rate of the vehicle, and the fifth corresponding relationship. The fifth corresponding relationship includes the preset corresponding relationship between the longitudinal acceleration, the steering wheel angle, the yaw rate, and the correction acceleration. The first weight coefficient and second weight coefficient are determined according to the correction acceleration. The acceleration of the vehicle is corrected to improve the accuracy of the acceleration of the vehicle acquired. Therefore, a more reasonable vehicle front and rear axle torque allocation of the vehicle driving under different work conditions may be given, and a risk of vehicle instability caused by oversteer or understeer when turning may be reduced.

According to some embodiments, the step 104, specifically may be achieved by step 104c and step 104d.

At 104c, a correction value is determined according to a longitudinal acceleration, steering wheel angle, and yaw rate, and a sixth corresponding relationship.

The sixth corresponding relationship includes a preset corresponding relationship between the longitudinal acceleration, steering wheel angle, and yaw rate, and the correction value.

It may be understood that, the preset corresponding relationship between the longitudinal acceleration, steering wheel angle, and yaw rate, and the correction value may be represented by a functional relation formula or may be represented in the form of a table. The specific functional relation formula and the table are obtained according to massive experimental data, which will not be limited according to embodiments of the disclosure.

At 104d, a correction acceleration is obtained by correcting the longitudinal acceleration according to the correction value.

At 104e, the first weight coefficient and second weight coefficient are determined according to the correction acceleration and the weight coefficient corresponding relationship.

According to embodiments of the disclosure, determining the first weight coefficient of the acceleration torque distribution coefficient and the second weight coefficient of the acceleration torque distribution coefficient according to the acceleration of the vehicle and the weight coefficient corresponding relationship includes: determining the correction value according to the longitudinal acceleration, the steering wheel angle, the yaw rate, and the sixth corresponding relationship, in which the sixth corresponding relationship includes the preset corresponding relationship between the longitudinal acceleration, the steering wheel angle, the yaw rate, and the correction value; obtaining the correction acceleration by correcting the longitudinal acceleration according to the correction value; and determining the first weight coefficient and second weight coefficient according to the correction acceleration. The acceleration of the vehicle is corrected to improve the accuracy of the acceleration of the vehicle acquired. Therefore, a more reasonable vehicle front and rear axle torque allocation of the vehicle driving under different work conditions may be given, and a risk of vehicle instability caused by oversteer or understeer when turning may be reduced.

Figure 8:
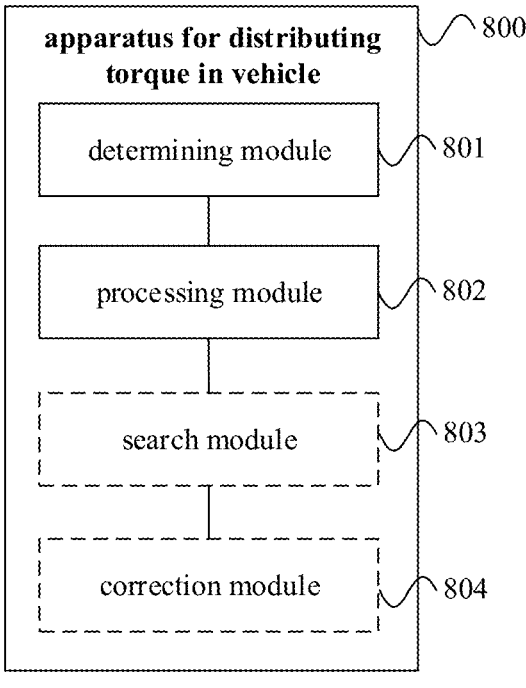
FIG. 8 is a block diagram illustrating an apparatus for distributing a torque of a vehicle according to embodiments of the disclosure.

FIG. 8 is a block diagram illustrating an apparatus for distributing a torque of a vehicle according to embodiments of the disclosure. As illustrated in FIG. 8, a determining module 801 is configured to determine a uniform-speed torque distribution coefficient according to a speed parameter of the vehicle, and a preset corresponding relationship between the speed parameter and the uniform-speed torque distribution coefficient. The uniform-speed torque distribution coefficient is a torque distribution coefficient of the vehicle in a uniform-speed state. The determining module 801 is further configured to determine an acceleration torque distribution coefficient according to the speed parameter of the vehicle, and a preset corresponding relationship between the speed parameter and the acceleration torque distribution coefficient. The acceleration torque distribution coefficient is a torque distribution coefficient of the vehicle in an acceleration state. The determining module 801 is further configured to determine a first weight coefficient of the uniform-speed torque distribution coefficient and a second weight coefficient of the acceleration torque distribution coefficient according to an acceleration of the vehicle and a weight coefficient corresponding relationship. The weight coefficient corresponding relationship includes a preset corresponding relationship between the acceleration and the first weight coefficient and second weight coefficient. The processing module 802 is configured to obtain a target torque distribution coefficient by performing a weight processing on the uniform-speed torque distribution coefficient and the acceleration torque distribution coefficient according to the first weight coefficient and the second weight coefficient.

According to some embodiments, when the speed parameter includes a longitudinal acceleration, a yaw rate, and a target deviation value, and the preset corresponding relationship between the speed parameter and the uniform-speed torque distribution coefficient is a first corresponding relationship, the determining module 801 is specifically configured to: determine a first uniform-speed distribution coefficient according to the longitudinal acceleration, yaw rate, and target deviation value, and the first corresponding relationship, in which the first corresponding relationship includes a preset corresponding relationship between the longitudinal acceleration, yaw rate, and target deviation value, and the first uniform-speed distribution coefficient, the first uniform-speed distribution coefficient is the uniform-speed torque distribution coefficient, and the target deviation value is a minimum deviation value between the yaw rate and a yaw rate safety interval. When the speed parameter includes a lateral acceleration and a vehicle speed, and the preset corresponding relationship between the speed parameter and the uniform-speed torque distribution coefficient is a second corresponding relationship, the determining module 801 is specifically configured to: determine a second uniform-speed distribution coefficient according to the lateral acceleration and vehicle speed, and the second corresponding relationship, in which the second corresponding relationship includes a preset corresponding relationship between the lateral acceleration and vehicle speed, and the second uniform-speed distribution coefficient, and the second uniform-speed distribution coefficient is the uniform-speed torque distribution coefficient.

According to some embodiments, the speed parameter includes a longitudinal acceleration, a yaw rate, a target deviation value, a lateral acceleration, and a vehicle speed, and the preset corresponding relationship between the speed parameter and the uniform-speed torque distribution coefficient includes a first corresponding relationship and a second corresponding relationship. The determining module 801 is specifically configured to: determine a first uniform-speed distribution coefficient according to the longitudinal acceleration, yaw rate, and target deviation value, and the first corresponding relationship, in which the first corresponding relationship includes a preset corresponding relationship between the longitudinal acceleration, yaw rate, and target deviation value, and the first uniform-speed distribution coefficient, and the target deviation value is a minimum deviation value between the yaw rate and a yaw rate safety interval; determine a second uniform-speed distribution coefficient according to the lateral acceleration and vehicle speed, and the second corresponding relationship, in which the second corresponding relationship includes a preset corresponding relationship between the lateral acceleration and vehicle speed, and the second uniform-speed distribution coefficient. The processing module 802 is further configured to obtain the uniform-speed torque distribution coefficient by performing a weight processing on the first uniform-speed distribution coefficient and the second uniform-speed weight coefficient.

According to some embodiments, the apparatus for distributing the torque in the vehicle according to embodiments of the disclosure further includes a search module 803. The first corresponding relationship includes a first rotation posture table and a uniform-speed distribution coefficient mapping table. The search module 803 is configured to obtain a first rotation posture corresponding to the longitudinal acceleration and yaw rate by searching the first rotation posture table; and obtain the first uniform-speed distribution coefficient corresponding to the first rotation posture and target deviation value by searching the uniform-speed distribution coefficient mapping table.

According to some embodiments, when the speed parameter includes a longitudinal acceleration, a yaw rate and a target deviation value, and the preset corresponding relationship between the speed parameter and the acceleration torque distribution coefficient is a third corresponding relationship, the determining module 801 is specifically configured to: determine a first acceleration distribution coefficient according to the longitudinal acceleration, yaw rate, and target deviation value, and the third corresponding relationship, in which the third corresponding relationship includes a preset corresponding relationship between the longitudinal acceleration, yaw rate, and target deviation value, and the first acceleration distribution coefficient, the first acceleration distribution coefficient is the acceleration torque distribution coefficient, and the target deviation value is a deviation value between the yaw rate and a yaw rate safety interval; or, when the speed parameter includes a lateral acceleration and a vehicle speed, and the preset corresponding relationship between the speed parameter and the acceleration torque distribution coefficient is a fourth corresponding relationship, determine a second acceleration distribution coefficient according to the lateral acceleration and vehicle speed, and the fourth corresponding relationship, in which the fourth corresponding relationship includes a preset corresponding relationship between the lateral acceleration and vehicle speed, and the second acceleration distribution coefficient, and the second acceleration distribution coefficient is the acceleration torque distribution coefficient.

According to some embodiments, the speed parameter includes a longitudinal acceleration, a yaw rate, a target deviation value, a lateral acceleration, and a vehicle speed, and the preset corresponding relationship between the speed parameter and the acceleration torque distribution coefficient is a third corresponding relationship and a fourth corresponding relationship. The determining module 801 is specifically configured to: determine a first acceleration distribution coefficient according to the longitudinal acceleration, yaw rate, and target deviation value, and the third corresponding relationship, in which the third corresponding relationship includes a preset corresponding relationship between the longitudinal acceleration, yaw rate, and target deviation value, and the first acceleration distribution coefficient, and the target deviation value is a deviation value between the yaw rate and a yaw rate safety interval; determine a second acceleration distribution coefficient according to the lateral acceleration and vehicle speed, and the fourth corresponding relationship, in which the fourth corresponding relationship includes a preset corresponding relationship between the lateral acceleration and vehicle speed, and the second acceleration distribution coefficient. The processing module 802 is further configured to obtain the acceleration torque distribution coefficient by performing a weight processing on the first acceleration distribution coefficient and the second acceleration weight coefficient.

According to some embodiments, the third corresponding relationship includes a second rotation posture table and an acceleration distribution coefficient mapping table. The search module 803 is further configured to obtain a second rotation posture corresponding to the longitudinal acceleration and yaw rate by searching the second rotation posture table; and obtain the first acceleration distribution coefficient corresponding to the second rotation posture and target deviation value by searching the acceleration distribution coefficient mapping table.

According to some embodiments, the acceleration is a correction acceleration, and the apparatus for distributing the torque in the vehicle according to embodiments of the disclosure further includes a correction module 804. The correction module 804 is configured to: obtain the correction acceleration by correcting a longitudinal acceleration according to the longitudinal acceleration, steering wheel angle, and yaw rate of the vehicle, and a fifth corresponding relationship, in which the fifth corresponding relationship includes a preset corresponding relationship between the longitudinal acceleration, steering wheel angle, and yaw rate, and the correction acceleration. The determining module 801 is specifically configured to determine the first weight coefficient and second weight coefficient according to the correction acceleration and the weight coefficient corresponding relationship.

According to some embodiments, the acceleration is a correction acceleration. The determining module 801 is further configured to: determine a correction value according to a longitudinal acceleration, steering wheel angle, and yaw rate, and a sixth corresponding relationship, in which the sixth corresponding relationship includes a preset corresponding relationship between the longitudinal acceleration, steering wheel angle, and yaw rate, and the correction value. The correction module 804 is specifically configured to obtain the correction acceleration by correcting the longitudinal acceleration according to the correction value. The determining module 801 is specifically configured to determine the first weight coefficient and second weight coefficient according to the correction acceleration and the weight coefficient corresponding relationship.

It needs to be noted that, as illustrated in FIG. 8, the module that must be included in the apparatus 800 for distributing the torque in the vehicle may be illustrated by a solid box, such as the determining module 801 and the processing module 802. The module that may be included or may not be included in the apparatus 800 for distributing the torque in the vehicle may be illustrated by a dashed box, such as the search module 803 and the correction module 804.

It needs to be noted that the apparatus for distributing the torque in the vehicle may be the vehicle in the above method embodiments, or may be functional modules and/or functional entities that may achieve functions of the apparatus embodiments in the vehicle, which will not be limited according to embodiments of the disclosure.

According to embodiments of the disclosure, modules may achieve the method for distributing the torque in the vehicle according to the above method embodiments, and may achieve the same technical effect, which will not be repeated to avoid repetition.

Figure 9:
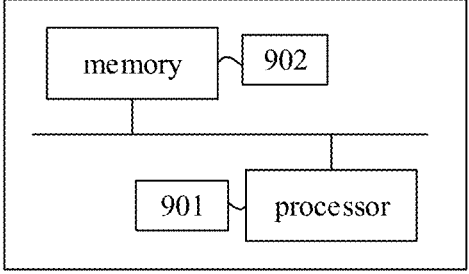
FIG. 9 is a block diagram illustrating a hardware of a vehicle according to embodiments of the disclosure.

A vehicle is further provided according to embodiments of the disclosure. As illustrated in FIG. 9, the vehicle may include a processor 901, a memory 902, and a program or instruction stored on the memory and executable by the processor 901. When the program or instruction is executed by the processor 901, processes of the method for distributing the torque of the vehicle may be achieved, and the same technical effect may be achieved, which will not be repeated to avoid repetition.

The processor 901 may be a modem, a baseband processor, a baseband chip, or one or more chips (or systems on a chip) used to execute the solutions of the disclosure. The processor 901 connects various components of the entire terminal device via various interfaces and circuits, and runs or executes software programs and/or modules in the memory 902 and calls data stored in the memory 902 to execute various functions and processing data of the terminal device, further to entirely monitor the terminal device. The memory 902 may be configured to store software programs and modules, and the processor 901 executes various functional applications and data processings of the terminal device by running software programs and modules stored in the memory 902. The memory 902 may mainly include a program storage area and a data storage area. The program storage area may store operation systems and application programs required by at least one function (for example, audio playback function, image playback function). The data storage area may store data created by the use of the terminal device (for example, audio data, a phone book), etc. In addition, the memory 902 may include a high-speed random access memory, and may also include a non-volatile memory, such as at least one magnetic disk storage device, flash memory device, or other non-volatile solid-state storage devices.

A readable storage medium storing a program or instruction is provided according to embodiments of the disclosure. When the program or instruction is executed by a processor, processes of the method for distributing the torque of the vehicle according to the above method embodiments may be implemented, and same technical effects may be achieved, which will not be repeated here to avoid repetition.

A computer program product including a computer program or instruction is further provided according to embodiments of the disclosure. When the computer program product runs on a processor, so that when the processor executes the computer program or instruction, processes of the method for distributing the torque of the vehicle according to the above method embodiments may be implemented, and same technical effects may be achieved, which will not be repeated here to avoid repetition.

A chip is further provided according to embodiments of the disclosure. The chip includes a processor and a communication interface. The communication interface is coupled with the processor. The processor is configured to execute a program or instruction, processes of embodiments of the method for distributing the torque of the vehicle may be achieved, and the same technical effect may be achieved, which will not be repeated to avoid repetition.

It should be understood that the chip referred to according to embodiments of the disclosure may be referred to as a system-level chip, a system chip, a chip system, or a system-on-chip, etc.

According to embodiments provided in the disclosure, it is to be understood that the disclosed system, the apparatus, the server and the method may be implemented in other ways. For example, the apparatus embodiments are merely illustrative, such as division of units, only a logical function division. There may be additional division modes when actual implementation, such as a plurality of units or components may be combined or may be integrated into another system, or some features may be omitted, or not performed. The coupling or direct coupling or communication connection of each other shown or discussed may be an indirect coupling or communication connection through some interfaces, devices, or units, which may be electrical, mechanical or in other forms.

The above units described as separate parts may or may not be physically separated, the parts shown as units may or may not be physical units, which may be located in one place, or may be distributed to a plurality of network units. Some or all units may be selected according to the actual requirements to achieve the purpose of the disclosure.

In addition, functional units according to embodiments of the disclosure may be integrated in a processing unit, or may be physically existed separately; or two or more units may be integrated in one unit. The above integrated unit may be implemented in the form of a hardware or in the form of a software function unit.

The integrated unit may be stored in a computer-readable storage medium if it is implemented in the form of a software function unit and sold and used as an independent product. On the basis of such an understanding, all or a part of the technical solution of the disclosure essentially or partly contributing to the related art, or part of the technical solution may be embodied in the form of a software product. The software product is stored in a storage medium including several instructions so that a computer device (which may be a personal computer, a server or a network device, etc.) is caused to perform all or part of steps of various embodiments of the disclosure. The forgoing medium includes a USB disk, a mobile hard disk, a read-only memory (ROM), a random access memory (RAM), a magnetic disk or an optical disk, and other media that may store program codes.

In summary; the above embodiments are only configured to describe the technical solution of the disclosure instead of a limitation; notwithstanding the disclosure is described in detail with reference to the above embodiments, those skilled in the art may understand that the technical solution recorded in the above embodiments may still be modified or part of technical features therein may be equivalently substituted; however, such modification or substitution doesn't drive the nature of the corresponding technical solution to deviate from the spirit and scope of the technical solution according to embodiments of the disclosure.

What is claimed is:

1. A method for distributing a torque in a vehicle, comprising:

determining a uniform-speed torque distribution coefficient according to a speed parameter of the vehicle, and a preset corresponding relationship between the speed parameter and the uniform-speed torque distribution coefficient, wherein the uniform-speed torque distribution coefficient is a torque distribution coefficient of the vehicle in a uniform-speed state;

determining an acceleration torque distribution coefficient according to the speed parameter of the vehicle, and a preset corresponding relationship between the speed parameter and the acceleration torque distribution coefficient, wherein the acceleration torque distribution coefficient is a torque distribution coefficient of the vehicle in an acceleration state;

determining a first weight coefficient of the uniform-speed torque distribution coefficient and a second weight coefficient of the acceleration torque distribution coefficient according to an acceleration of the vehicle and a weight coefficient corresponding relationship, wherein the weight coefficient corresponding relationship comprises a preset corresponding relationship between the acceleration and the first weight coefficient and the second weight coefficient;

obtaining a target torque distribution coefficient by performing a weight processing on the uniform-speed torque distribution coefficient and the acceleration torque distribution coefficient according to the first weight coefficient and the second weight coefficient; and distributing the torque in the vehicle according to the target torque distribution coefficient.

2. The method according to claim 1, wherein when the speed parameter comprises a longitudinal acceleration, a yaw rate, and a target deviation value, and the preset corresponding relationship between the speed parameter and the uniform-speed torque distribution coefficient is a first corresponding relationship, determining the uniform-speed torque distribution coefficient according to the speed parameter of the vehicle, and the preset corresponding relationship between the speed parameter and the uniform-speed torque distribution coefficient comprises:

determining a first uniform-speed distribution coefficient according to the longitudinal acceleration, the yaw rate, and the target deviation value, and the first corresponding relationship, wherein the first corresponding relationship comprises a preset corresponding relationship between the longitudinal acceleration, the yaw rate, and the target deviation value, and the first uniform-speed distribution coefficient, the first uniform-speed distribution coefficient is the uniform-speed torque distribution coefficient, and the target deviation value is a minimum deviation value between the yaw rate and a yaw rate safety interval;

wherein when the speed parameter comprises a lateral acceleration and a vehicle speed, and the preset corresponding relationship between the speed parameter and the uniform-speed torque distribution coefficient is a second corresponding relationship, determining the uniform-speed torque distribution coefficient according to the speed parameter of the vehicle, and the preset corresponding relationship between the speed parameter and the uniform-speed torque distribution coefficient comprises:

determining a second uniform-speed distribution coefficient according to the lateral acceleration and the vehicle speed, and the second corresponding relationship, wherein the second corresponding relationship comprises a preset corresponding relationship between the lateral acceleration and the vehicle speed, and the second uniform-speed distribution coefficient, and the second uniform-speed distribution coefficient is the uniform-speed torque distribution coefficient.

3. The method according to claim 2, wherein the first corresponding relationship comprises a first rotation posture table and a uniform-speed distribution coefficient mapping table;

wherein determining the first uniform-speed distribution coefficient according to the longitudinal acceleration, the yaw rate, and the target deviation value, and the first corresponding relationship, comprises:

obtaining a first rotation posture corresponding to the longitudinal acceleration and the yaw rate by searching the first rotation posture table; and obtaining the first uniform-speed distribution coefficient corresponding to the first rotation posture and the target deviation value by searching the uniform-speed distribution coefficient mapping table.

4. The method according to claim 1, wherein the speed parameter comprises a longitudinal acceleration, a yaw rate, a target deviation value, a lateral acceleration, and a vehicle speed, and the preset corresponding relationship between the speed parameter and the uniform-speed torque distribution coefficient comprises a first corresponding relationship and a second corresponding relationship;

wherein determining the uniform-speed torque distribution coefficient according to the speed parameter of the vehicle, and the preset corresponding relationship between the speed parameter and the uniform-speed torque distribution coefficient comprises:

determining a first uniform-speed distribution coefficient according to the longitudinal acceleration, the yaw rate, and the target deviation value, and the first corresponding relationship, wherein the first corresponding relationship comprises a preset corresponding relationship between the longitudinal acceleration, the yaw rate, and the target deviation value, and the first uniform-speed distribution coefficient, and the target deviation value is a minimum deviation value between the yaw rate and a yaw rate safety interval;

determining a second uniform-speed distribution coefficient according to the lateral acceleration and the vehicle speed, and the second corresponding relationship, wherein the second corresponding relationship comprises a preset corresponding relationship between the lateral acceleration and the vehicle speed, and the second uniform-speed distribution coefficient; and obtaining the uniform-speed torque distribution coefficient by performing a weight processing on the first uniform-speed distribution coefficient and the second uniform-speed distribution coefficient.

5. The method according to claim 1, wherein when the speed parameter comprises a longitudinal acceleration, a yaw rate, and a target deviation value, and the preset corresponding relationship between the speed parameter and the acceleration torque distribution coefficient is a third corresponding relationship, determining the acceleration torque distribution coefficient according to the speed parameter of the vehicle, and the preset corresponding relationship between the speed parameter and the acceleration torque distribution coefficient comprises:

determining a first acceleration distribution coefficient according to the longitudinal acceleration, the yaw rate, and the target deviation value, and the third corresponding relationship, wherein the third corresponding relationship comprises a preset corresponding relationship between the longitudinal acceleration, the yaw rate, and the target deviation value, and the first acceleration distribution coefficient, the first acceleration distribution coefficient is the acceleration torque distribution coefficient, and the target deviation value is a deviation value between the yaw rate and a yaw rate safety interval; or, when the speed parameter comprises a lateral acceleration and a vehicle speed, and the preset corresponding relationship between the speed parameter and the acceleration torque distribution coefficient is a fourth corresponding relationship, determining a second acceleration distribution coefficient according to the lateral acceleration and the vehicle speed, and the fourth corresponding relationship, wherein the fourth corresponding relationship comprises a preset corresponding relationship between the lateral acceleration and the vehicle speed, and the second acceleration distribution coefficient, and the second acceleration distribution coefficient is the acceleration torque distribution coefficient.

6. The method according to claim 5, wherein the third corresponding relationship comprises a second rotation posture table and an acceleration distribution coefficient mapping table;

determining the first acceleration distribution coefficient according to the longitudinal acceleration, the yaw rate, and the target deviation value, and the third corresponding relationship comprises:

obtaining a second rotation posture corresponding to the longitudinal acceleration and the yaw rate by searching the second rotation posture table; and obtaining the first acceleration distribution coefficient corresponding to the second rotation posture and the target deviation value by searching the acceleration distribution coefficient mapping table.

7. The method according to claim 1, wherein when the speed parameter comprises a longitudinal acceleration, a yaw rate, a target deviation value, a lateral acceleration, and a vehicle speed, wherein the preset corresponding relationship between the speed parameter and the acceleration torque distribution coefficient is a third corresponding relationship and a fourth corresponding relationship;

wherein determining the acceleration torque distribution coefficient according to the speed parameter of the vehicle, and the preset corresponding relationship between the speed parameter and the acceleration torque distribution coefficient comprises:

determining a first acceleration distribution coefficient according to the longitudinal acceleration, the yaw rate, and the target deviation value, and the third corresponding relationship, wherein the third corresponding relationship comprises a preset corresponding relationship between the longitudinal acceleration, the yaw rate, and the target deviation value, and the first acceleration distribution coefficient, and the target deviation value is a deviation value between the yaw rate and a yaw rate safety interval;

determining a second acceleration distribution coefficient according to the lateral acceleration and the vehicle speed, and the fourth corresponding relationship, wherein the fourth corresponding relationship comprises a preset corresponding relationship between the lateral acceleration and the vehicle speed, and the second acceleration distribution coefficient; and obtaining the acceleration torque distribution coefficient by performing a weight processing on the first acceleration distribution coefficient and the second acceleration distribution coefficient.

8. The method according to claim 1, wherein the acceleration is a correction acceleration, and determining the first weight coefficient of the uniform-speed torque distribution coefficient and the second weight coefficient of the acceleration torque distribution coefficient according to the acceleration of the vehicle and the weight coefficient corresponding relationship comprises:

obtaining the correction acceleration by correcting a longitudinal acceleration according to the longitudinal acceleration, steering wheel angle, and yaw rate of the vehicle, and a fifth corresponding relationship, wherein the fifth corresponding relationship comprises a preset corresponding relationship between the longitudinal acceleration, the steering wheel angle, and the yaw rate, and the correction acceleration; and determining the first weight coefficient and the second weight coefficient according to the correction acceleration and the weight coefficient corresponding relationship.

9. The method according to claim 1, wherein the acceleration is a correction acceleration, and determining the first weight coefficient of the uniform-speed torque distribution coefficient and the second weight coefficient of the acceleration torque distribution coefficient according to the acceleration of the vehicle and the weight coefficient corresponding relationship comprises:

determining a correction value according to a longitudinal acceleration, steering wheel angle, and yaw rate, and a sixth corresponding relationship, wherein the sixth corresponding relationship comprises a preset corresponding relationship between the longitudinal acceleration, the steering wheel angle, and the yaw rate, and the correction value;

obtaining the correction acceleration by correcting the longitudinal acceleration according to the correction value; and determining the first weight coefficient and the second weight coefficient according to the correction acceleration and the weight coefficient corresponding relationship.

10. A vehicle, comprising:
a memory storing a computer program, and
a processor, wherein the processor is configured to call the computer program, to perform:

determining a uniform-speed torque distribution coefficient according to a speed parameter of the vehicle, and a preset corresponding relationship between the speed parameter and the uniform-speed torque distribution coefficient, wherein the uniform-speed torque distribution coefficient is a torque distribution coefficient of the vehicle in a uniform-speed state;

determining an acceleration torque distribution coefficient according to the speed parameter of the vehicle, and a preset corresponding relationship between the speed parameter and the acceleration torque distribution coefficient, wherein the acceleration torque distribution coefficient is a torque distribution coefficient of the vehicle in an acceleration state;

determining a first weight coefficient of the uniform-speed torque distribution coefficient and a second weight coefficient of the acceleration torque distribution coefficient according to an acceleration of the vehicle and a weight coefficient corresponding relationship, wherein the weight coefficient corresponding relationship comprises a preset corresponding relationship between the acceleration and the first weight coefficient and the second weight coefficient;

obtaining a target torque distribution coefficient by performing a weight processing on the uniform-speed torque distribution coefficient and the acceleration torque distribution coefficient according to the first weight coefficient and the second weight coefficient; and distributing a torque in the vehicle according to the target torque distribution coefficient.

11. The vehicle according to claim 10, wherein when the speed parameter comprises a longitudinal acceleration, a yaw rate, and a target deviation value, and the preset corresponding relationship between the speed parameter and the uniform-speed torque distribution coefficient is a first corresponding relationship, determining the uniform-speed torque distribution coefficient according to the speed parameter of the vehicle, and the preset corresponding relationship between the speed parameter and the uniform-speed torque distribution coefficient comprises:

determining a first uniform-speed distribution coefficient according to the longitudinal acceleration, the yaw rate, and the target deviation value, and the first corresponding relationship, wherein the first corresponding relationship comprises a preset corresponding relationship between the longitudinal acceleration, the yaw rate, and the target deviation value, and the first uniform-speed distribution coefficient, the first uniform-speed distribution coefficient is the uniform-speed torque distribution coefficient, and the target deviation value is a minimum deviation value between the yaw rate and a yaw rate safety interval;

wherein when the speed parameter comprises a lateral acceleration and a vehicle speed, and the preset corresponding relationship between the speed parameter and the uniform-speed torque distribution coefficient is a second corresponding relationship, determining the uniform-speed torque distribution coefficient according to the speed parameter of the vehicle, and the preset corresponding relationship between the speed parameter and the uniform-speed torque distribution coefficient comprises:

determining a second uniform-speed distribution coefficient according to the lateral acceleration and the vehicle speed, and the second corresponding relationship, wherein the second corresponding relationship comprises a preset corresponding relationship between the lateral acceleration and the vehicle speed, and the second uniform-speed distribution coefficient, and the second uniform-speed distribution coefficient is the uniform-speed torque distribution coefficient.

12. The vehicle according to claim 11, wherein the first corresponding relationship comprises a first rotation posture table and a uniform-speed distribution coefficient mapping table;

wherein determining the first uniform-speed distribution coefficient according to the longitudinal acceleration, the yaw rate, and the target deviation value, and the first corresponding relationship, comprises:

obtaining a first rotation posture corresponding to the longitudinal acceleration and the yaw rate by searching the first rotation posture table; and obtaining the first uniform-speed distribution coefficient corresponding to the first rotation posture and the target deviation value by searching the uniform-speed distribution coefficient mapping table.

13. The vehicle according to claim 10, wherein the speed parameter comprises a longitudinal acceleration, a yaw rate, a target deviation value, a lateral acceleration, and a vehicle speed, and the preset corresponding relationship between the speed parameter and the uniform-speed torque distribution coefficient comprises a first corresponding relationship and a second corresponding relationship;

wherein determining the uniform-speed torque distribution coefficient according to the speed parameter of the vehicle, and the preset corresponding relationship between the speed parameter and the uniform-speed torque distribution coefficient comprises:

determining a first uniform-speed distribution coefficient according to the longitudinal acceleration, the yaw rate, and the target deviation value, and the first corresponding relationship, wherein the first corresponding relationship comprises a preset corresponding relationship between the longitudinal acceleration, the yaw rate, and the target deviation value, and the first uniform-speed distribution coefficient, and the target deviation value is a minimum deviation value between the yaw rate and a yaw rate safety interval;

determining a second uniform-speed distribution coefficient according to the lateral acceleration and the vehicle speed, and the second corresponding relationship, wherein the second corresponding relationship comprises a preset corresponding relationship between the lateral acceleration and the vehicle speed, and the second uniform-speed distribution coefficient; and obtaining the uniform-speed torque distribution coefficient by performing a weight processing on the first uniform-speed distribution coefficient and the second uniform-speed distribution coefficient.

14. The vehicle according to claim 10, wherein when the speed parameter comprises a longitudinal acceleration, a yaw rate, and a target deviation value, and the preset corresponding relationship between the speed parameter and the acceleration torque distribution coefficient is a third corresponding relationship, determining the acceleration torque distribution coefficient according to the speed parameter of the vehicle, and the preset corresponding relationship between the speed parameter and the acceleration torque distribution coefficient comprises:

determining a first acceleration distribution coefficient according to the longitudinal acceleration, the yaw rate, and the target deviation value, and the third corresponding relationship, wherein the third corresponding relationship comprises a preset corresponding relationship between the longitudinal acceleration, the yaw rate, and the target deviation value, and the first acceleration distribution coefficient, the first acceleration distribution coefficient is the acceleration torque distribution coefficient, and the target deviation value is a deviation value between the yaw rate and a yaw rate safety interval; or, when the speed parameter comprises a lateral acceleration and a vehicle speed, and the preset corresponding relationship between the speed parameter and the acceleration torque distribution coefficient is a fourth corresponding relationship, determining a second acceleration distribution coefficient according to the lateral acceleration and the vehicle speed, and the fourth corresponding relationship, wherein the fourth corresponding relationship comprises a preset corresponding relationship between the lateral acceleration and the vehicle speed, and the second acceleration distribution coefficient, and the second acceleration distribution coefficient is the acceleration torque distribution coefficient.

15. The vehicle according to claim 14, wherein the third corresponding relationship comprises a second rotation posture table and an acceleration distribution coefficient mapping table;

determining the first acceleration distribution coefficient according to the longitudinal acceleration, the yaw rate, and the target deviation value, and the third corresponding relationship comprises:

obtaining a second rotation posture corresponding to the longitudinal acceleration and the yaw rate by searching the second rotation posture table; and obtaining the first acceleration distribution coefficient corresponding to the second rotation posture and the target deviation value by searching the acceleration distribution coefficient mapping table.

16. The vehicle according to claim 10, wherein when the speed parameter comprises a longitudinal acceleration, a yaw rate, a target deviation value, a lateral acceleration, and a vehicle speed, wherein the preset corresponding relationship between the speed parameter and the acceleration torque distribution coefficient is a third corresponding relationship and a fourth corresponding relationship;

wherein determining the acceleration torque distribution coefficient according to the speed parameter of the vehicle, and the preset corresponding relationship between the speed parameter and the acceleration torque distribution coefficient comprises:

determining a first acceleration distribution coefficient according to the longitudinal acceleration, the yaw rate, and the target deviation value, and the third corresponding relationship, wherein the third corresponding relationship comprises a preset corresponding relationship between the longitudinal acceleration, the yaw rate, and the target deviation value, and the first acceleration distribution coefficient, and the target deviation value is a deviation value between the yaw rate and a yaw rate safety interval;

determining a second acceleration distribution coefficient according to the lateral acceleration and the vehicle speed, and the fourth corresponding relationship, wherein the fourth corresponding relationship comprises a preset corresponding relationship between the lateral acceleration and the vehicle speed, and the second acceleration distribution coefficient; and obtaining the acceleration torque distribution coefficient by performing a weight processing on the first acceleration distribution coefficient and the second acceleration distribution coefficient.

17. The vehicle according to claim 10, wherein the acceleration is a correction acceleration, and determining the first weight coefficient of the uniform-speed torque distribution coefficient and the second weight coefficient of the acceleration torque distribution coefficient according to the acceleration of the vehicle and the weight coefficient corresponding relationship comprises:

obtaining the correction acceleration by correcting a longitudinal acceleration according to the longitudinal acceleration, steering wheel angle, and yaw rate of the vehicle, and a fifth corresponding relationship, wherein the fifth corresponding relationship comprises a preset corresponding relationship between the longitudinal acceleration, the steering wheel angle, and the yaw rate, and the correction acceleration; and determining the first weight coefficient and the second weight coefficient according to the correction acceleration and the weight coefficient corresponding relationship.

18. The vehicle according to claim 10, wherein the acceleration is a correction acceleration, and determining the first weight coefficient of the uniform-speed torque distribution coefficient and the second weight coefficient of the acceleration torque distribution coefficient according to the acceleration of the vehicle and the weight coefficient corresponding relationship comprises:

determining a correction value according to a longitudinal acceleration, steering wheel angle, and yaw rate, and a sixth corresponding relationship, wherein the sixth corresponding relationship comprises a preset corresponding relationship between the longitudinal acceleration, the steering wheel angle, and the yaw rate, and the correction value;

obtaining the correction acceleration by correcting the longitudinal acceleration according to the correction value; and determining the first weight coefficient and the second weight coefficient according to the correction acceleration and the weight coefficient corresponding relationship.

19. A non-transitory computer-readable storage medium storing a computer program, wherein when the computer program is executed by a processor of a vehicle, a method for distributing a torque in the vehicle is performed, the method comprising:

determining a uniform-speed torque distribution coefficient according to a speed parameter of the vehicle, and a preset corresponding relationship between the speed parameter and the uniform-speed torque distribution coefficient, wherein the uniform-speed torque distribution coefficient is a torque distribution coefficient of the vehicle in a uniform-speed state;

determining an acceleration torque distribution coefficient according to the speed parameter of the vehicle, and a preset corresponding relationship between the speed parameter and the acceleration torque distribution coefficient, wherein the acceleration torque distribution coefficient is a torque distribution coefficient of the vehicle in an acceleration state;

determining a first weight coefficient of the uniform-speed torque distribution coefficient and a second weight coefficient of the acceleration torque distribution coefficient according to an acceleration of the vehicle and a weight coefficient corresponding relationship, wherein the weight coefficient corresponding relationship comprises a preset corresponding relationship between the acceleration and the first weight coefficient and the second weight coefficient;

obtaining a target torque distribution coefficient by performing a weight processing on the uniform-speed torque distribution coefficient and the acceleration torque distribution coefficient according to the first weight coefficient and the second weight coefficient; and distributing the torque in the vehicle according to the target torque distribution coefficient.

* * * * *